(12) United States Patent
Jayaraman et al.

(10) Patent No.: US 10,253,146 B2
(45) Date of Patent: Apr. 9, 2019

(54) THERMOPLASTIC POLYMERIC NANOCOMPOSITE FILMS AND RELATED METHODS

(71) Applicant: BOARD OF TRUSTEES OF MICHIGAN STATE UNIVERSITY, East Lansing, MI (US)

(72) Inventors: Krishnamurthy Jayaraman, East Lansing, MI (US); Weijie Ren, East Lansing, MI (US); Rahul H. Rane, Maharashtra (IN)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 62 days.

(21) Appl. No.: 15/294,053

(22) Filed: Oct. 14, 2016

(65) Prior Publication Data
US 2017/0107341 A1 Apr. 20, 2017

Related U.S. Application Data

(60) Provisional application No. 62/242,414, filed on Oct. 16, 2015.

(51) Int. Cl.
| | |
|---|---|
| C08J 5/18 | (2006.01) |
| C08L 23/12 | (2006.01) |
| B29C 47/00 | (2006.01) |
| C08J 3/22 | (2006.01) |
| C08J 5/00 | (2006.01) |
| C08K 9/04 | (2006.01) |
| C08L 51/06 | (2006.01) |
| B29K 105/00 | (2006.01) |
| B29L 7/00 | (2006.01) |
| B29K 101/12 | (2006.01) |
| B29C 55/12 | (2006.01) |
| B29C 55/28 | (2006.01) |

(52) U.S. Cl.
CPC ............ *C08J 5/18* (2013.01); *B29C 47/0021* (2013.01); *B29C 47/0057* (2013.01); *C08J 3/226* (2013.01); *C08J 5/005* (2013.01); *C08K 9/04* (2013.01); *C08L 23/12* (2013.01); *C08L 51/06* (2013.01); *B29C 55/12* (2013.01); *B29C 55/28* (2013.01); *B29K 2101/12* (2013.01); *B29K 2105/0005* (2013.01); *B29L 2007/008* (2013.01); *C08J 2300/22* (2013.01); *C08J 2323/10* (2013.01); *C08J 2323/12* (2013.01); *C08J 2353/00* (2013.01); *C08J 2423/26* (2013.01); *C08L 2205/08* (2013.01); *C08L 2207/04* (2013.01)

(58) Field of Classification Search
CPC ..... C08J 5/18; C08J 5/005; C08J 3/226; C08J 2300/22; C08J 2323/10; C08J 2323/12; C08J 2353/00; C08J 2423/26; C08L 51/06; C08L 23/12; C08L 2207/04; C08L 2205/08; C08K 9/04; B29C 47/0021; B29C 47/0057; B29C 55/28; B29C 55/12; B29K 2101/12; B29K 2105/0005; B29L 2007/008

See application file for complete search history.

(56) References Cited

U.S. PATENT DOCUMENTS

2008/0281010 A1* 11/2008 Lefas ............... C08J 9/0028
521/97
2010/0310802 A1 12/2010 Jayaraman et al.

OTHER PUBLICATIONS

Piscitelli, F., et al.; Journal of Colloid and Interface Science, 2010, vol. 351, p. 108-115.*
Ren, W., et al.; Industrial and Engineering Chemistry Research, 2014, p. 4264-4273.*
Dontula, N., et al.; Journal of Cellular Plastics, 2007, vol. 43, p. 145-156.*
Amit Kumar Chaudhary, Krishnamurthy Jayaraman "Extrusion of Linear Polypropylene-Clay Nanocomposite Foams," *Polymer Engineering and Science* 51(9):1749-1756 Sep. 2011.
Weijie Ren and K. Jayaraman, "Processing of Recycled Polypropylene-Clay Nanocomposites," presented at Society of Plastics Engineers Automotive TPO meeting in Troy, Michigan, Oct. 5-8, 2014.
K. Jayaraman, "Processing of Recycled Polyolefin," presented at department research forum Jun. 2015.
Weijie Ren and K. Jayaraman, "Masterbatch Additives for Processing Films from Polypropylene," presented at department research forum Oct. 16, 2015.

* cited by examiner

*Primary Examiner* — Robert S Jones
(74) *Attorney, Agent, or Firm* — Marshall, Gerstein & Borun LLP

(57) ABSTRACT

The disclosure relates to a nanocomposite polymeric film including a thermoplastic polymer matrix such as polypropylene or other polyolefin, a coupling agent-modified organoclay reinforcement, and a polymeric compatibilizer bound to the coupling agent-modified organoclay, in particular as a thin film with controllable thicknesses. The disclosure further relates to masterbatch additives formed from the coupling agent-modified organoclay and the polymeric compatibilizer bound to the coupling agent-modified organoclay as well as related methods for making the nanocomposite polymeric film and/or processing recycled plastics. The inclusion of the coupling agent-modified organoclay reinforcement improves the mechanical properties of the nanocomposite polymeric film and the rheological properties of polymer melts including the nanocomposite polymeric film components. The coupling agent-modified organoclay leads to strain-hardening behavior for the polymer melts, which in turn can improve extensional viscosity values and melt processability for film blowing.

22 Claims, 11 Drawing Sheets

Scheme 1. Structure of Silane Coupling Agents

THERMOPLASTIC POLYMERIC NANOCOMPOSITE FILMS AND RELATED METHODS

CROSS REFERENCE TO RELATED APPLICATION

Priority is claimed to U.S. Provisional Application No. 62/242,414, filed Oct. 16, 2015, which is incorporated herein by reference in its entirety.

STATEMENT OF GOVERNMENT INTEREST

None.

BACKGROUND OF THE DISCLOSURE

Field of the Disclosure

The disclosure relates to polymeric masterbatch additives formed from a coupling agent-modified organoclay and a polymeric compatibilizer bound to the coupling agent-modified organoclay. The disclosure further relates to a nanocomposite polymeric film including a thermoplastic polymer matrix, a coupling agent-modified organoclay reinforcement, and a polymeric compatibilizer bound to the coupling agent-modified organoclay as well as related methods for making the nanocomposite polymeric film.

SUMMARY

The disclosure relates to a nanocomposite polymeric film including a thermoplastic polymer matrix, a coupling agent-modified organoclay reinforcement, and a polymeric compatibilizer bound to the coupling agent-modified organoclay. The disclosure further relates to masterbatch additives formed from the coupling agent-modified organoclay and the polymeric compatibilizer bound to the coupling agent-modified organoclay as well as related methods for making the nanocomposite polymeric film and/or processing recycled plastics. The inclusion of the coupling agent-modified organoclay reinforcement improves the mechanical properties of the nanocomposite polymeric film and the rheological properties of polymer melts including the nanocomposite polymeric film components. The coupling agent-modified organoclay leads to strain-hardening behavior for the polymer melts, which in turn can improve extensional viscosity values and melt processability for film blowing (e.g., providing films with relatively smaller and more consistent film thicknesses).

In one aspect, the disclosure relates to a nanocomposite polymeric film comprising: (a) a thermoplastic polymer matrix (e.g., amorphous, crystalline, semi-crystalline; preferably a linear polymer, such as not branched and/or not cross-linked); (b) a coupling agent-modified organoclay (e.g., as a nanocomposite reinforcement in the matrix), wherein the coupling agent is bound to both edges and faces of the organoclay (e.g., lamellar platelets thereof and in galleries between adjacent platelets); and (c) a polymeric compatibilizer bound to the coupling agent-modified organoclay.

In another aspect, the disclosure relates to nanocomposite polymeric film comprising: (a) a thermoplastic polymer matrix comprising polypropylene; (b) a silane coupling agent-modified organoclay, wherein (i) the silane coupling agent is bound to both edges and faces of the organoclay (e.g., covalently bound and/or hydrogen-bonded), and (ii) the silane coupling agent-modified organoclay has an interlayer spacing between adjacent organoclay platelets of at least 0.1 nm greater than the interlayer spacing of a corresponding organoclay without the coupling agent-modification; and (c) a maleated polyolefin polymeric compatibilizer bound to the silane coupling agent modified organoclay; wherein: (i) the film has a thickness of 1 mil or less; and (ii) the film has a thickness relative standard deviation (RSD) of 25% or less.

In another aspect, the disclosure relates to a masterbatch additive comprising: (a) a coupling agent-modified organoclay, wherein (i) the coupling agent is bound to both edges and faces of the organoclay (e.g., covalently bound and/or hydrogen-bonded), and (ii) the coupling agent-modified organoclay has an interlayer spacing between adjacent organoclay platelets of at least 0.1 nm greater than the interlayer spacing of a corresponding organoclay without the coupling agent modification; and (c) a polymeric compatibilizer bound to the coupling agent-modified organoclay.

In another aspect, the disclosure relates to a method for making a nanocomposite polymeric film, the method comprising: (a) providing a polymer melt comprising: (i) a thermoplastic polymer, (ii) a coupling agent-modified organoclay, wherein the coupling agent is bound to both edges and faces of the organoclay, and (iii) a polymeric compatibilizer bound to the coupling agent-modified organoclay; (b) blowing or extruding and stretching the polymer melt to form the nanocomposite polymeric film. In a refinement, providing the polymer melt in part (a) comprises melt blending a masterbatch additive comprising the coupling agent-modified organoclay and the polymeric compatibilizer with the thermoplastic polymer.

Various refinements and embodiments of the disclosed nanocomposite polymeric film, masterbatch additive, and related methods are possible. For example, the film can have a thickness of 1 mil or less (e.g., at least 0.2, 0.3, or 0.4 mil and/or up to 0.4, 0.6, 0.8, or 1 mil), such as a thickness ranging from 0.2 mil to 0.8 mil, 0.2 mil to 0.4 mil, 0.4 mil to 0.8 mil, or 0.4 mil to 1 mil. In an embodiment, the film has a thickness relative standard deviation (RSD) of 25% or less (e.g., at least 1%, 2%, or 5% and/or up to 10%, 15%, 20% or 25%). The RSD can be determined by measuring film thickness at 10, 15, 18, 20, 30, or 40 or more locations on a sample of the film (e.g., at locations that are spaced apart by at least 1, 1.5, 2, 5, 10, or 15 mm from each other) to determine an average film thickness and a film thickness standard deviation from the measured location data points, where the RSD is the ratio of the film thickness standard deviation to the average film thickness.

In an embodiment, the thermoplastic polymer matrix comprises one or more of a polyolefin, polyacrylate, poly (acrylonitrile-butadiene-styrene), poly(lactic acid), polybenzimidazole, polycarbonate, polyether sulfone, polyetherether ketone, polyetherimide, polyphenylene oxide, polyphenylene sulfide, polystyrene, polyvinyl chloride polyester, polyamide, copolymers thereof (e.g., block or random), and combinations thereof. In another embodiment, the thermoplastic polymer comprises a polyolefin selected from the group consisting of polyethylene, polypropylene, polymethylpentene, polybutene (e.g., polybutene-1), block copolymers thereof (e.g., propylene-ethylene block copolymer), random copolymers thereof, and mixtures thereof. In another embodiment, the thermoplastic polymer comprises polypropylene (e.g., linear polypropylene; including block and/or random copolymers with propylene such as ethylene, other olefins, or other vinyl monomers).

In an embodiment, the coupling agent is covalently bonded and/or hydrogen bonded to both the edges and the faces of the organoclay, for example by silanol condensation of silyl alkoxy hydrolysable groups to form covalent bonds (e.g., in particular at organoclay edge sites as shown in FIG. 13) and by hydrogen bonding between hydrolyzed silanol (—SiOH) groups in the coupling agent and surface oxygen atoms of the organoclay (e.g., in particular at organoclay face sites as shown in FIG. 13). Alternative or additional binding mechanisms can include physical adsorption, electrostatic attraction, etc. In another embodiment, the coupling agent comprises a silane coupling agent (e.g., aminosilane or other organosilane with an organofunctional group (such as amino) and with one or more hydrolysable groups (such as alkoxy or halide groups) which are hydrolyzed and covalently and/or hydrogen-bonded to the organoclay edges and faces in the coupling agent-modified organoclay). In another embodiment, the coupling agent-modified organoclay has an interlayer spacing (or d-spacing) between adjacent organoclay platelets of at least 0.1 nm greater than the interlayer spacing of a corresponding organoclay without the coupling agent modification (e.g., at least 0.1 nm, 0.15 nm, 0.2 nm, 0.4 nm, or 0.6 nm and/or up to 0.2 nm, 0.4 nm, 0.7 nm, 1 nm, 1.5 nm, or 2 nm; for example 0.1 nm to 2 nm or 0.15 nm to 1 nm; such as measured by X-ray diffraction). The coupling agent-modified organoclay (in particular a silane-modified nanoclay) can be formed using a dry contacting process between the coupling agent and the (unmodified) organoclay, which is particularly useful in obtaining sufficient increases in the interlayer spacing for correspondingly good edge-and-face binding between the coupling agent and the organoclay. In some embodiments, the coupling agent-modified organoclay (in particular a silane-modified nanoclay) can be formed using a wet contacting process between the coupling agent and the (unmodified) organoclay that provides sufficient interlayer spacing increase. In another embodiment, the organoclay comprises a smectite clay (e.g., montmorillonites, vermiculites, bentonites; including a surfactant modification of the clay with organophilic ions exchanged into the interlayer clay galleries).

In an embodiment, the polymeric compatibilizer is bound to the coupling agent-modified organoclay at the edges and the faces of the organoclay. For example, binding can be by hydrogen bonding and/or covalent bonding, such as by amide or imide linkages between a (primary or secondary) amino group (e.g., in the coupling agent) and a carboxylic acid group, a dicarboxylic acid group, an anhydride thereof, etc. (e.g., in the polymeric compatibilizer). In another embodiment, the polymeric compatibilizer comprises a maleate functional group (e.g., a maleic acid or maleic anhydride comonomer grafted to a polymeric chain such as any of the foregoing thermoplastic polymers or copolymers such as polypropylene-graft-maleic anhydride). In another embodiment, the polymeric compatibilizer comprises a thermoplastic polymer and a modifier functional group for binding to the coupling agent-modified organoclay (e.g., any of the foregoing thermoplastic polymers or copolymers with a further modifier functional group such as a maleate functional group).

In an embodiment, the ratio of the polymeric compatibilizer to the coupling agent-modified organoclay (e.g., in the nanocomposite polymeric film or in the masterbatch additive) ranges from 0.1 to 10 (e.g., at least 0.1, 0.2, 0.5, 1, 1.5 or 2 and/or up to 1, 1.5, 2, 2.5 3, 5, 7, or 10, such as from 1 to 3 or 1.5 to 2.5). In another embodiment, the combined amount of the polymeric compatibilizer and the coupling agent-modified organoclay in the nanocomposite polymeric film ranges from 2 wt. % to 50 wt. % (e.g., at least 2, 5, 10, or 15 wt. % and/or up to 15, 20, 30, 40, or 50 wt. %, such as 5 wt. % to 30 wt. % or 10 wt. % to 20 wt. %). In another embodiment, the amount of the coupling agent-modified organoclay in the nanocomposite polymeric film ranges from 0.5 wt. % to 15 wt. % (e.g., at least 0.5, 1, 2, 4, or 6 wt. % and/or up to 6, 8, 10, 12, or 15 wt. %, such as 2 wt. % to 12 wt. % or 6 wt. % to 10 wt. %). In another embodiment, the amount of the thermoplastic polymer in the nanocomposite polymeric film ranges from 50 wt. % to 98 wt. % (e.g., at least 50, 60, 70, 80 or 90 wt. % and/or up to 75, 80, 90, 95, or 98 wt. %, such as 60 wt. % to 95 wt. % or 70 wt. % to 90 wt. %).

While the disclosed compounds, methods and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

DETAILED DESCRIPTION

Figure 1:
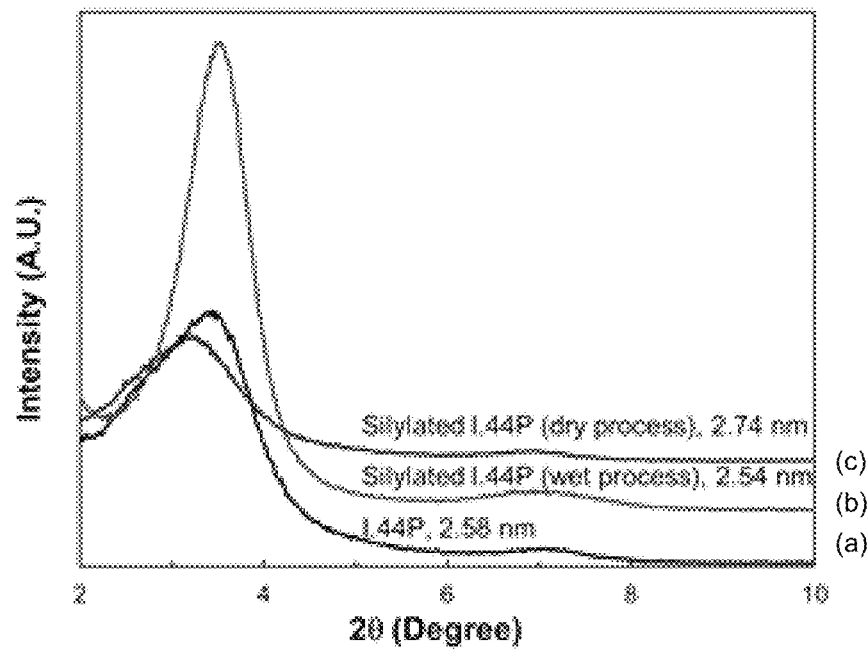
FIG. 1 is a graph showing XRD patterns of (a) I.44P untreated organoclay, (b) silylated organoclay by wet process, and (c) silylated organoclay by dry process.

The disclosure relates to a nanocomposite polymeric film including a thermoplastic polymer matrix, a coupling agent-modified organoclay reinforcement, and a polymeric compatibilizer bound to the coupling agent-modified organoclay. At relatively low loadings and due to a relatively large surface area, organoclay additives can provide mechanical reinforcement to a polymer matrix with improved tensile properties, improved heat stability properties to a polymer film matrix, improved barrier properties to a polymer film matrix, improved flame retardance to a polymer matrix, and melt rheology modification in terms of melt strength and strain hardening in extensional flows. The disclosure further relates to masterbatch additives formed from the coupling agent-modified organoclay and the polymeric compatibilizer bound to the coupling agent-modified organoclay as well as related methods for making the nanocomposite polymeric film and/or processing recycled plastics. The inclusion of the coupling agent-modified organoclay reinforcement improves the mechanical properties of the nanocomposite polymeric film and the rheological properties of polymer melts including the nanocomposite polymeric film components. The coupling agent-modified organoclay leads to strain-hardening behavior for the polymer melts, which in turn can improve extensional viscosity values and melt processability for film blowing (e.g., providing films with relatively smaller and more consistent film thicknesses). For example, blown polypropylene films with thicknesses of 1 mil or less and relatively little spatial thickness variation are possible.

The disclosure relates to masterbatch additives formulated for thermoplastic polymer matrices such as polypropylene or other polyolefins that will allow steady film blowing at a film thickness (or gauge) of 1 mil (0.001") or less, for example at least 0.2, 0.3, or 0.4 mil and/or up to 0.4, 0.6, 0.8, or 1 mil. The films can be produced with a relatively consistent film thickness (e.g., a low thickness variation at different locations in the film). In an embodiment, the film has a thickness relative standard deviation (RSD) of 25% or less, for example at least 1%, 2%, or 5% and/or up to 10%, 15%, 20% or 25%. The RSD can be determined by measuring film thickness at 10, 15, 18, 20, 30, or 40 or more locations on a sample of the film (e.g., at locations that are spaced apart by at least 1, 1.5, 2, 5, 10, or 15 mm from each other) to determine an average film thickness and a film thickness standard deviation from the measured location data points, where the RSD is the ratio of the film thickness standard deviation to the average film thickness.

The films have acceptable mechanical properties such as tear strength, tensile strength and elongation to failure, resistance to sticking at higher temperatures (e.g., for use in paint ovens), and enhanced barrier to vapors. Relative to a corresponding thermoplastic polymer film without the coupling agent-modified organoclay and the polymeric compatibilizer, the nanocomposite polymeric films generally have comparable mechanical properties in the machine direction (e.g., tear strength, tensile strength, and/or elongation to failure for the nanocomposite film that is within +/− about 10%, 20%, or 30% of that of the corresponding thermoplastic polymer film), but generally exhibit improved mechanical properties in the transverse direction (e.g., tear strength, tensile strength, and/or elongation to failure for the nanocomposite film that is at least 10%, 20%, 30%, or 50% and/or up to 30%, 50%, 80%, 100%, 200%, or 300% higher than that of the corresponding thermoplastic polymer film). The nanocomposite polymeric films can exhibit advantageous heat stability properties, including a lack of sticking, deformation, and/or melting when the films are subjected to elevated temperatures over 100° C., such as up to 200° C. For example, when multiple sheets of nanocomposite polymeric film according to the disclosure are tested for temperature resistance as described in the examples below, the nanocomposite polymeric film can resist temperatures of at least 100° C., 120° C., or 140° C. and/or up to 140° C., 160° C., 165° C., 170° C., 180° C., or 200° C. without exhibiting one or more of sticking, deformation, and/or melting (e.g., where such heat instability events generally eventually occur in order of sticking, then deformation, and then melting at successively increasing temperatures), for example at a film thickness of 0.4 mil, 0.6 mil, 0.8 mil, 1.0 mil, or range therebetween.

The masterbatch additive can be melt-compounded with a thermoplastic polymer matrix (e.g. polypropylene or other polyolefin) without detracting from the properties of the resin. The disclosed masterbatch formulations also preserve the ease of processing and can improve the heat resistance of the resulting nanocomposite polymeric film. The disclosed masterbatch additive includes an organoclay nanomaterial (e.g., a surfactant-modified nanoclay) and a polymeric compatibilizer (e.g., higher molecular weight polymer chains with reactive end groups). Relatively high molecular weights suitable for the thermoplastic polymer and/or the polymeric compatibilizer can include weight-average molecular weights ($M_w$) of at least 50,000, 80,000, 100,000, or 120,000 and/or up to 160,000, 200,000, 250,000, or 300,000, such as 50,000 to 300,000 or 100,000 to 200,000, where the various values and ranges can apply independently to either or both of the thermoplastic polymer and the polymeric compatibilizer. The organoclay nanomaterial is treated and modified with a reactive coupling agent such as a silane coupling agent (e.g., with as little as 0.5 wt. % or 1 wt. % coupling agent relative to the treated organoclay nanomaterial by a dry or solvent-free process) such that the coupling agent is coupled to the edges and faces of the organoclay nanoplatelets (e.g., at the edges of the nanoplatelets and in the galleries on faces between adjacent nanoplatelets).

Thin-gauge (e.g., 0.3 to 0.4 mil thick) plastic sheeting can be used as a substrate masking film and is a superior alternative to masking paper in paint booths for the substrate, such as for automotive repair (e.g., where the automobile or a part therefor is the substrate being painted). The plastic used currently to make the masking film is high molecular weight high density polyethylene (HMW-HDPE). The paint oven temperature is capped at 100° C., because HDPE film can withstand only up to 100° C. in the paint oven. In contrast, other polyolefins such as polypropylene which have much greater heat resistance than HDPE (above to withstand temperatures over 100° C., such as up to 200° C.) are typically available only as much thicker films (e.g., 1 mil or above). As an alternative to a thin film such HDPE with low heat resistance, the disclosed polymeric film includes a nanocomposite additive (e.g., masterbatch of a polymeric compatibilizer and a coupling agent-modified organoclay) for other polyolefins such as polypropylene to allow stable production of a film with a film thickness of 1 mil or less and/or with relatively low film thickness variation (e.g., with a thickness relative standard deviation (RSD) of 25% or less).

The disclosed nanocomposite polymeric film is superior because the film is much thinner than what is currently available for many thermoplastic polymers (e.g., polyolefins such as polypropylene or otherwise) relative to the same thermoplastic polymer without the masterbatch additive), and/or the film has a comparable thickness as that of a thin-film HDPE (e.g., 0.3 to 0.4 mil thick) while providing superior properties, especially compared with the HDPE film in terms of both allowed temperature range in a paint oven and mechanical strength. Various benefits of the disclosed masterbatch additive and corresponding nanocomposite polymeric film include one or more of: (i) preservation of end-use properties with a high molecular weight polymer compatibilizer in masterbatch; (ii) good dispersion after letdown (or blending) with a bulk thermoplastic polymer matrix material (e.g., polyolefin such as high molecular weight polypropylene); (iii) preserved or enhanced processability in film blowing operations; (iv) environmental friendliness and maintenance of product recyclability; (v) promotion of chemical coupling with nanoparticles so that there is potential for improved higher temperature resistance in the nanocomposite polymeric film.

Thermoplastic Polymer

Thermoplastic polymers suitable for incorporation into the nanocomposite polymeric film are not particularly limited. They can include amorphous, crystalline, or semi-crystalline thermoplastic polymers. A crystalline polymer has a substantial fraction (e.g., all or substantially all) of its material or regions in a crystalline state generally characterized as having a long-range three-dimensional order on the atomic scale. An amorphous polymer generally refers to a polymer having substantially no crystalline regions. An amorphous polymer undergoes a single transition when cooled from a molten phase, to form a glassy solid structure. A semi-crystalline polymers generally refers to a polymer having both crystalline and amorphous regions. The crystalline regions melt at a higher temperature than the amorphous regions, allowing the amorphous regions to start moving around at lower temperatures. However, melting or flow of a semi-crystalline polymer does not occur until the crystalline domains are melted. A semi-crystalline polymer therefore undergoes multiple transitions when cooling from a molten phase, depending on the rate of crystallization, to produce products with varying sizes of crystals, and therefore, varying properties.

In some embodiments, the thermoplastic polymer forming the polymer matrix for the film is a linear polymer. In further embodiments, the thermoplastic polymer matrix can be free or substantially free from branched and/or cross-linked polymers in general or thermoplastic polymers in particular, for example where the thermoplastic polymer matrix is formed only from linear thermoplastic polymers.

Examples of suitable thermoplastic polymer for inclusion in the polymer matrix of the nanocomposite film include one or more of a polyolefin, polyacrylate, poly(acrylonitrile-butadiene-styrene), poly(lactic acid), polybenzimidazole, polycarbonate, polyether sulfone, polyetherether ketone, polyetherimide, polyphenylene oxide, polyphenylene sulfide, polystyrene, polyvinyl chloride polyester, polyamide, copolymers thereof (e.g., block or random), and combinations (e.g., mixtures or blends) thereof. In an embodiment, the thermoplastic polymer includes one or more polyolefins such as polyethylene, polypropylene, polymethylpentene, polybutene (e.g., polybutene-1), block copolymers thereof (e.g., propylene-ethylene block copolymer), random copolymers thereof, and mixtures thereof. In another embodiment, the thermoplastic polymer includes polypropylene (e.g., linear polypropylene; including block and/or random copolymers with propylene such as ethylene, other olefins, or other vinyl monomers).

The amount of thermoplastic polymer incorporated into the nanocomposite polymeric film is not particularly limited. In various embodiments, the amount of the thermoplastic polymer in the nanocomposite polymeric film ranges from 50 wt. % to 98 wt. %, for example at least 50, 60, 70, 80 or 90 wt. % and/or up to 75, 80, 90, 95, or 98 wt. %, such as 60 wt. % to 95 wt. % or 70 wt. % to 90 wt. %.

Coupling Agent-Modified Nanoclay

Polymer nanocomposites with layered silicates such as organoclays have two different types of interface sites: at edges and faces of the nanolayers. The edge sites have hydroxyl groups and the sites on the gallery faces have oxygen atoms along with exchangeable cations in the galleries. For example, sodium montmorillonite is organically modified by exchanging the sodium ions from the galleries with organophilic onium ion surfactants carrying one to two alkyl tails, each with 18 carbons typically. When the matrix polymer is nonpolar such as polypropylene (PP), other polyolefin or other thermoplastic polymer, some amount of functionalized polypropylene (or polyolefin) such as grafted with maleic anhydride (e.g., PP-g-MA) or other polymeric compatibilizer is added to promote polymer-particle interactions, typically in the form of hydrogen bonding between the anhydride (or other compatibilizing group) and the groups on the nanolayer surfaces. The polymer-particle interface at the edge and/or face sites may be strengthened further by means of coupling agents such as silane coupling agents that interact with the nanolayer sites at one end and with the functionalized polymeric compatibilizer at the other end. The use of coupling agents can also lead to improved dispersion and improved mechanical properties.

Figure 13:
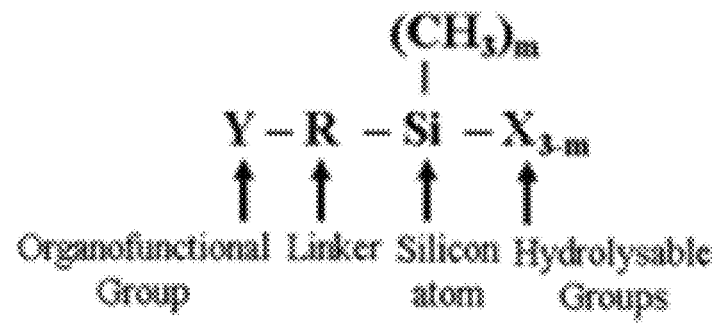
FIG. 13 illustrates representative coupling agent structures and coupling of same to interfacial edges and faces of organoclay surfaces.
Figure 13:
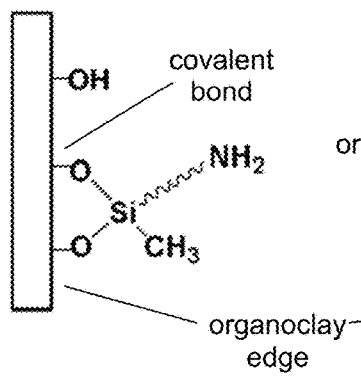
Figure 13:
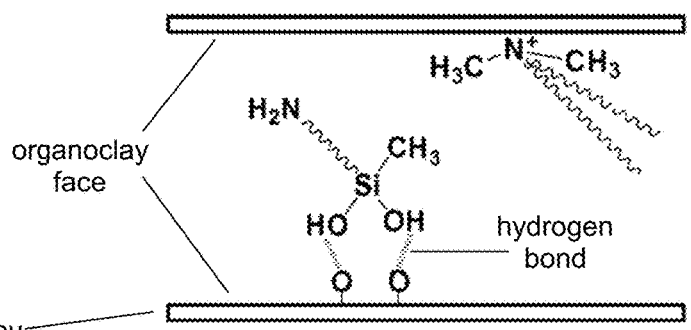

FIG. 13 illustrates a general silane coupling agent as a representative coupling agent and coupling of the same to interfacial edges and faces of organoclay surfaces. The properties and effects of silanes are determined by their molecular structures, generally represented as shown in Scheme 1 of FIG. 13. The silicon at the center is linked through a spacer R to an organofunctional group Y (e.g., including one or more amino groups) at one end and directly to hydrolyzable groups such as alkoxy groups at the other end (e.g., where m is 0, 1, or 2 and the illustrated methyl group, when present, more generally can be an alkyl group). The alkoxy groups hydrolyze to hydroxyl groups and react with the hydroxyl groups at the edges of the clay to form Al—O—Si bonds or they may form hydrogen bonds with the active sites on the gallery faces (FIG. 13, bottom panel). The organofunctional group Y interacts with the polymeric compatibilizer either by hydrogen bonding (e.g., as illustrated on the organoclay face in FIG. 13) or by forming a covalent bond (e.g., as illustrated on the organoclay edge in FIG. 13). Depending upon the molecular structure of the coupling agents (e.g., silane coupling agent or otherwise), it can end up either inside the layered clay galleries resulting in an increase in the basal spacing or react mainly with the edge hydroxyl groups. The presence of (silane) coupling agent molecules within the clay galleries could provide greater interaction between the polymer and the clay, resulting in better dispersion and improved mechanical properties.

A coupling agent generally includes an agent that creates a chemical bond (e.g., covalent bond, hydrogen bond) between the organoclay and the polymeric compatibilizer. In an embodiment, the coupling agent is covalently bonded to both the edges and the faces of the organoclay (e.g., by silanol condensation of silyl alkoxy hydrolysable groups).

Alternative or additional binding mechanisms can include hydrogen bonding, physical adsorption, electrostatic attraction, etc. Example coupling agents include silane-based coupling agents and titanate-based and phosphonate-based coupling agents. Silane-based coupling agents can include organosilanes having one or more alkoxy groups, such as monomethoxy, dimethoxy and/or trimethoxy group, or one or more halide groups (e.g., chloride, bromide, or iodide) and a functional group, such as an amino group or an aza group. In particular, the silane coupling agent can be an aminosilane or other organosilane with an organofunctional group (such as amino) and with one or more hydrolysable groups (such as alkoxy or halide groups) which are hydrolyzed and covalently bonded and/or hydrogen bonded (e.g., via surface oxygen atoms) to the organoclay edges and faces in the coupling agent-modified organoclay.

Organoclays are comprised of stacked rectangular layers or platelets (which includes square platelets). As such, organoclays are often categorized by their aspect ratios, which is a ratio of the square root of the planar area of any one platelet to its thickness. Any organoclay having a suitable aspect ratio may be used in the coupling agent-modified organoclay and corresponding nanocomposite film and/or masterbatch additive. If the aspect ratio is too high, the organoclay can be more difficult to disperse in the polymer matrix. If the aspect ratio is too small, the improvement to properties of the resulting nanocomposite, such as melt strength, could be marginal, and properties may not be satisfactory. In one embodiment, the aspect ratio is at least 100:200. In one embodiment, the aspect ratio is no more than about 300:500. In one embodiment, the aspect ratio may be any ratio between about 100-300:200-500, although the disclosed compositions are not so limited.

A suitable organoclay generally includes layered smectite clay with organophilic ions exchanged into the interlayer galleries. Examples of smectite clay include montmorillonites, vermiculites, and bentonites, for example including a surfactant modification of the clay with organophilic ions exchanged into the interlayer clay galleries.

The coupling agent-modified organoclay can be characterized according to its interlayer spacing (or d-spacing) between adjacent organoclay platelets, which is increased relative to that of the organoclay prior to coupling agent modification. In an embodiment, the coupling agent-modified organoclay has an interlayer spacing (or d-spacing) between adjacent organoclay platelets of at least 0.1 nm greater than the interlayer spacing of a corresponding organoclay without the coupling agent modification, for example at least 0.1 nm, 0.15 nm, 0.2 nm, 0.4 nm, or 0.6 nm and/or up to 0.2 nm, 0.4 nm, 0.7 nm, 1 nm, 1.5 nm, or 2 nm; for example 0.1 nm to 2 nm or 0.15 nm to 1 nm, which can be measured by X-ray diffraction. The coupling agent-modified organoclay (in particular a silane-modified nanoclay) can be formed using a dry contacting process between the coupling agent and the (unmodified) organoclay, which is particularly useful in obtaining sufficient increases in the interlayer spacing for correspondingly good edge-and-face binding between the coupling agent and the organoclay. In some embodiments, the coupling agent-modified organoclay (in particular a silane-modified nanoclay) can be formed using a wet contacting process between the coupling agent and the (unmodified) organoclay that provides sufficient interlayer spacing increase. Coupling agent modification of the organoclay according to both dry and wet processes are described and illustrated in more detail in the examples below.

The amount of coupling agent-modified organoclay incorporated into the nanocomposite polymeric film is not particularly limited. In various embodiments, the amount of the coupling agent-modified organoclay in the nanocomposite polymeric film ranges from 0.5 wt. % to 15 wt. %, for example at least 0.5, 1, 2, 4, or 6 wt. % and/or up to 6, 8, 10, 12, or 15 wt. %, such as 2 wt. % to 12 wt. % or 6 wt. % to 10 wt. %.

Polymeric Compatibilizer

A polymeric compatibilizer generally includes a polymer modifier that enhances physical interactions between a bulk polymer and another material, such as the organoclay in the disclosure nanocomposite films. One example of a polymeric compatibilizer is maleated polypropylene (or other maleated polyolefin), useful for enhancing physical interactions between a bulk polymer and organoclays. A maleated polypropylene/polyolefin is a polypropylene/polyolefin that has been chemically modified with maleic anhydride especially at the chain ends. More generally, the polymeric compatibilizer can include a thermoplastic polymer and a modifier functional group for binding to the coupling agent-modified organoclay. The thermoplastic polymer for the polymeric compatibilizer can be any of the thermoplastic polymers as described above for the film polymer matrix, and it can be the same or different polymer as used for the film polymer matrix.

In the formed nanocomposite film, the polymeric compatibilizer suitably is bound to the coupling agent-modified organoclay at both the edges and the faces of the organoclay (e.g., as is the coupling agent). For example, binding can be by hydrogen bonding and/or covalent bonding, such as by amide or imide linkages between a (primary or secondary) amino group (e.g., in the coupling agent) and a carboxylic acid group, a dicarboxylic acid group, an anhydride thereof, etc. (e.g., a maleate group or other functional group in the polymeric compatibilizer).

The amount of polymeric compatibilizer incorporated into the nanocomposite polymeric film and/or masterbatch additive is not particularly limited. In an embodiment about 3 wt % to about 97 wt % of a polymeric compatibilizer, such as maleated propylene, is incorporated in the film, including any range therebetween. In other embodiments, up to 5 wt %, up to 10 wt %, up to 20 wt %, up to 30 wt %, up to 40 wt %, up to 50 wt %, up to 60 wt %, up to 70 wt %, up to 80 wt %, up to 90 wt %, up to 95 to less than 97 wt % is used, such as about 5 wt % to 25 wt % polymeric compatibilizer relative to the nanocomposite polymeric film. In other embodiments, the ratio of the polymeric compatibilizer to the coupling agent-modified organoclay (e.g., in the nanocomposite polymeric film or in the masterbatch additive) ranges from 0.1 to 10, for example at least 0.1, 0.2, 0.5, 1, 1.5 or 2 and/or up to 1, 1.5, 2, 2.5 3, 5, 7, or 10, such as from 1 to 3 or 1.5 to 2.5. In other embodiments, the combined amount of the polymeric compatibilizer and the coupling agent-modified organoclay in the nanocomposite polymeric film ranges from 2 wt. % to 50 wt. %, for example at least 2, 5, 10, or 15 wt. % and/or up to 15, 20, 30, 40, or 50 wt. %, such as 5 wt. % to 30 wt. % or 10 wt. % to 20 wt. %.

Related disclosure is included Ren et al., *Ind. Eng. Chem. Res.*, 2015, 54 (16), pp. 4264-4273 (web publication Dec. 15, 2014), incorporated herein by reference in its entirety. Also incorporated herein by reference in its entirety, Jayaraman et al. U.S. Publication No. 2010/03100802 is directed to nanocomposite foams (i.e., not nanocomposite polymeric films as disclosed herein), but contains description related to the present disclosure for suitable thermoplastic polymers, organoclay materials, coupling agents, and polymeric compatibilizers, etc.

EXAMPLES

The following examples illustrate the nanocomposite polymeric films, related masterbatch compositions, and related methods disclosed herein, but are not intended to be limiting.

Example 1: Masterbatch Additives for Processing Films from Polypropylene

Introduction

This example illustrates the use of silane coupling agents in polypropylene-clay nanocomposites. A dry, solvent-free silane treatment process was used to treat organically modified montmorillonite (NANOCOR I.44P); better penetration of the interlayer galleries of I.44P by silane was achieved this way than in the case of solvent mediated silane treatment. The silylated clay was then compounded with a maleic anhydride functionalized propylene-ethylene copolymer as compatibilizer to prepare masterbatch additives which were subsequently let down with a high molecular weight propylene-ethylene block copolymer in a twin screw extruder. The resulting compounds with 5 wt % and 8 wt % nanoclay were characterized for morphology (by transmission electron microscopy) and for rheology in dynamic shear and in uniaxial extensional flow (with an SER fixture mounted on a TA-ARES instrument). The compounds were used to prepare blown films of two different thicknesses. These films were then evaluated for mechanical properties and in particular, the strain to failure in the transverse direction was greater for nanocomposite film. The masterbatch additives have also been used to boost the properties and processability of reprocessed or recycle linear polypropylene.

The film blowing process involves biaxial stretching of the polymer melt and it is important to have sufficient strain hardening during extensional flow to obtain films with good bubble stability and thickness uniformity. For example, molten linear polypropylene exhibits no strain hardening in extensional flows and this property can be obtained by adding branched polymer (e.g., at least 20 wt %) or by adding nanoclay (e.g., about 5 wt %) with well-chosen polymeric compatibilizer. Incorporation of nanoclay in polypropylene has been reported to give blown films with a higher Young's modulus and tensile strength, but a much lower elongation to break. Film blowing of polyolefin nanocomposites has also been reported to give enhanced barrier properties by orienting the nanolayers.

Melt compounding of nanoparticles with polymers is usually facilitated by pre-compounding a masterbatch containing a high loading of nanoparticles; the masterbatch can then be added to the bulk polymer in a let-down stage. In the case of polyolefins and organoclay or organically modified montmorillonite, the masterbatch includes a functionalized polyolefin compatibilizer. It has been reported that nanocomposites prepared with the masterbatch led to better clay dispersion, even for small values of compatibilizer to clay ratio. Additional treatment of the organoclay with silane coupling agents leads to improved dispersion and improved mechanical properties and in some cases, enhanced processability in the form of greater strain hardening of the melt in extensional flows. When the silane penetrated the interlayer galleries and provided reactive coupling to the polymeric compatibilizer at the faces as well, the uniaxial extensional viscosity displayed a greater extent of strain hardening. The silane treatment work was carried out by a wet process in a methanol-water mixture and could not uniformly provide this penetration of galleries in all cases—particularly the organoclay that had a greater interlayer packing of quaternary onium ion surfactant with two alkyl tails (e.g., organically modified clay). An alternative vapor phase treatment process has been reported to provide greater penetration of silanes in the interlayer galleries.

This example illustrates the use of vapor phase silylation on a montmorillonite that was ion exchanged with quaternary onium ion surfactant, the incorporation of the resulting product in a masterbatch before preparing nanocomposites with virgin polypropylene, and examination of the rheology, film blowing processability and film properties of the nanocomposites. The following sections illustrate that the masterbatch additives disclosed herein lead to much improved rheology and processability for film blowing and also yield films with more uniform thickness as well as greater elongation to failure.

Materials:

The film grade polymer PPC300.4 from Spartan Polymers Inc. (Wilmette, Ill.), was a propylene-ethylene (PP-PE) block copolymer with 12 to 15 wt % ethylene and had a melt flow index of 0.45 g/10 min (230° C./2.16 kg). The neat PP-PE block copolymer has a 1% secant modulus of about 0.8 GPa. Maleic anhydride grafted PP (PP-g-MA) was used as compatibilizer: EXXELOR 1015 (Mw=123,000, MA content=0.42%; denoted as "PO1015") from ExxonMobil (Irving, Tex.) was a copolymer with a melting temperature of 145° C. The organoclay used was NANOMER I.44P from Nanocor (China), which has a quaternary onium ion surfactant with two C18 tails. The silane coupling agent was aminoalkyldimethoxysilane (more specifically N-aminoethyl-3-aminopropyl trimethoxy silane), from Evonik Industries (Essen, Germany); this can react with the anhydride group of the PP-g-MA to form an amide or imide linkage.

Processing Procedures:

Two different silane treatment processes were used for this example: a wet process and a dry process. The wet process was used as control to illustrate the difference in interface sites of silane coupling by the two methods but only silylated organoclay based on the dry process was used to make the nanocomposites. The wet process for grafting reaction was carried out in a methanol/water mixture (80/20 by volume). 15 g of organoclay and 4.5 g of silane were added in a glass beaker with 700 ml of the solvent mixture. After 6 hours of stirring at room temperature, the clay suspension was filtered and rinsed for 3 times using the same solvent to remove any unreacted silane. The resulting precipitate was left in an oven at 80° C. with a vacuum of 500 mm Hg for 24 hours. The dry process was carried out by Malvern Minerals Co. (Hot Springs, Ark.) in a process in which the organoclay was exposed to 1 wt % refluxed silane vapor. In both processes, the treated clay was sieved with a No. 200 sieve (74 micron pass).

Nanocomposites were prepared by melt compounding in a Leistritz, co-rotating twin-screw extruder (diameter=27 mm, L/D=48) with a screw speed of 250 rpm at 190° C. Before compounding, the PP-g-MA and organoclays were dried overnight in a vacuum oven. A two-step process involving adding masterbatches to bulk polymer in a "letdown" operation was used. The masterbatch had a large loading of the organoclay (20 to 30 wt %) combined with polymer compatibilizer that is of low molecular weight. 20 wt % of neat PPC300 was also included for masterbatch preparation in order to build up high torque values for better mixing. The detailed compositions of various compounds are shown in Table 1. Both PPC300 and nanocomposites were then blown into 1 mil (25.4 micron) thick films with a blow-up ratio of 3.2.

TABLE 1

Compositions of different nanocomposites

| Designation | | PP-PE: PPC300 (wt %) | PP-g-MA: PO1015 (wt %) | Organoclay:Silylated I.44P (wt %) |
|---|---|---|---|---|
| Masterbatch | MB1 | 20 | 53.3 | 26.7 |
| | MB2 | 20 | 48 | 32 |
| Let-down | PPNC1 | 85 | 10 | 5 |
| | PPNC2 | 76 | 16 | 8 |
| | PPNC3 | 80 | 12 | 8 |

Characterization Procedures:

Thermogravimetric analysis (TGA) was carried out with a TA Instruments Q500 apparatus to evaluate the weight loss of various organoclays with increasing temperature. The analysis was performed by heating about 10 mg of clay powder from room temperature to 800° C. using a high resolution ramp under a nitrogen atmosphere. The high resolution ramp varies the heating/cooling rate of the furnace in response to changes in the rate of decomposition of the sample to improve weight change resolution.

X-ray diffraction (XRD) was used to characterize the interlayer distance between stacked clay platelets. A Bruker Davinci diffractometer operating at 40 kV, 40 mA with Ni-filtered Cu Kα radiation source was used. To obtain XRD pattern of clay samples, the clay powder was compacted on a glass disc. All tests were run over a 2θ range of 0.4-10° with equal increments of 0.02°. Transmission electron micrographs were obtained with a JEOL 2200FS instrument at 200 kV acceleration voltage, from 90 nm thick sections prepared by cryomicrotoming of nanocomposite extrudates and collected on a 200 mesh copper grid.

Dynamic shear tests were carried out on a TA Instruments AR2000 Rheometer with parallel plates of diameter 40 mm Compression molded disc samples were tested over a frequency range from 0.01 to 100 rad/s at 200° C. under nitrogen flow. A fixed strain of 1% was used in all cases. A strain sweep was also carried out to ensure that this was within the linear viscoelastic regime of each material. The melt extensional viscosity of the nanocomposites was measured using a Sentmanat Extensional Rheometric fixture (SER-2) mounted on a TA-ARES instrument. Test specimens (24 mm×10 mm×0.75 mm) were compression molded at 200° C. at a pressure of 8 tons. The extensional viscosity measurements were made for PPC300 and nanocomposites at 200° C. and at two strain rates (0.5 and 1.0 s$^{-1}$) over Hencky strains up to 3.

The film thickness was recorded at various positions across the circumference of the film with a TMI digital micrometer. Eighteen positions were measured for each film at a distance of 1.5 cm and the standard deviation (SD) value was calculated for each material to evaluate the thickness uniformity. Tensile properties of the blown films at both machined direction (MD) and transverse direction (TD) were evaluated with an Instron Universal Testing Machine model 5565, based on ASTM-882. The tensile characteristics were measured at 500 mm/min crosshead speed with initial gauge length of 50 mm. The tear resistance of blown films was tested based on ASTM D1922 with Elmendorf Tearing Tester. Because of the thickness non-uniformity as will be discussed below, the film samples used for mechanical test were selectively cut to have a mean thickness of 25 mm. Measurements on five different specimens were averaged for each compound.

The refractive indices of blown film along the machine direction (MD), transverse (TD), and normal direction (ND) were measured using a Metricon Prism Coupler Model 2010/M with an accuracy of +/−0.0005. Refractive index of the prism used for the measurement was 1.9648. The birefringence was then calculated as the difference in refractive index between two orthogonal directions.

The crystal structure and orientation of layered silicates in blown films were characterized with ZEISS Field Emission Scanning Electron Microscope (FESEM) at an accelerating voltage of 20 kV. Samples were prepared for viewing by sputtering with a layer of 1 nm tungsten. The advantage of FESEM is that the crystalline morphology can be directly observed without any chemical treatment on the samples. Transmission Electron Micrographs were also obtained for nanocomposite blown films sliced by the MD-TD plane to investigate the particle orientations.

Characterization of Nanoclay:

FIG. 1 shows the results of XRD characterization for different organoclays. The d-spacing of the aminoalkyldimethoxy silane treated I.44P via wet process was about the same as that of the I.44P organoclay without silane treatment, indicating that silane reaction occurs at the edges alone of the I.44P. In contrast, a dry process-based silane treatment of I.44P led to an increase of d-spacing from 2.54 nm to 2.74 nm. This expanded interlayer spacing after silane treatment of organoclay has been reported as an indication of silane intercalation into the gallery of silicate layers. Therefore, the dry process allows silane to functionalize both the edges and faces while in the case of wet process, only edges are modified for I.44P organoclay.

Figure 2:
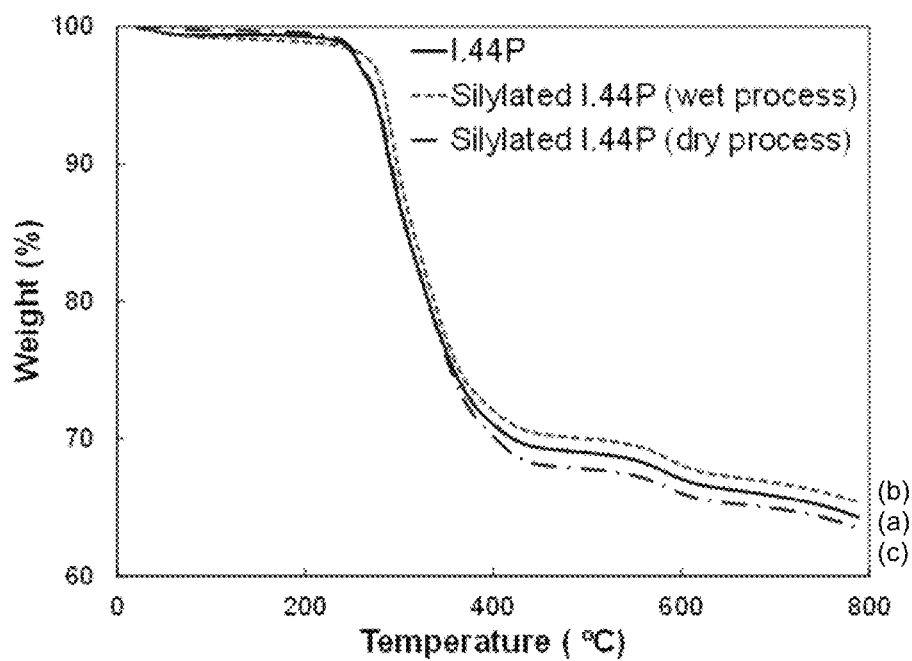
FIG. 2 is a graph showing TGA profiles (a) of I.44P untreated organoclay, (b) silylated organoclay by wet process, and (c) silylated organoclay by dry process.

The TGA profiles of the I.44P and silylated organoclay with different processes are presented in FIG. 2. The mass loss in the region of 200-500° C. was due to the decomposition of organic portion of organoclay. The low organic content of organoclay after silane grafting from wet process is attributed to the washout of some surfactants by the solvent during treatment. This also led to a delay for the onset thermal decomposition temperature of surfactants from 220° C. for I.44P organoclay to 240° C. For silylated organoclay based on dry process, no surfactant was lost during the treatment, as no change for onset thermal decomposition temperature was observed. The residual mass of organoclay at T=450° C. decreased from 69.3% for untreated I.44P to 68.2% for dry process silylated I.44P indicating the presence of around 1 wt % silane in the latter case after treatment.

In this example, silylated I.44P organoclay from dry process was used as the major nanofiller for preparing polypropylene nanocomposites and blown films. The loss of surfactants for silylated I.44P from wet process makes it less compatible with the polypropylene matrix than the one based on dry process. Also, it has been demonstrated that organoclay with silane functionalization occurring at both faces and edges, as in the case of the silylated I.44P from dry process, led to a better nanocomposite compound in terms of rheological properties and particle dispersion than organoclay with silane at edges alone.

Figure 3:
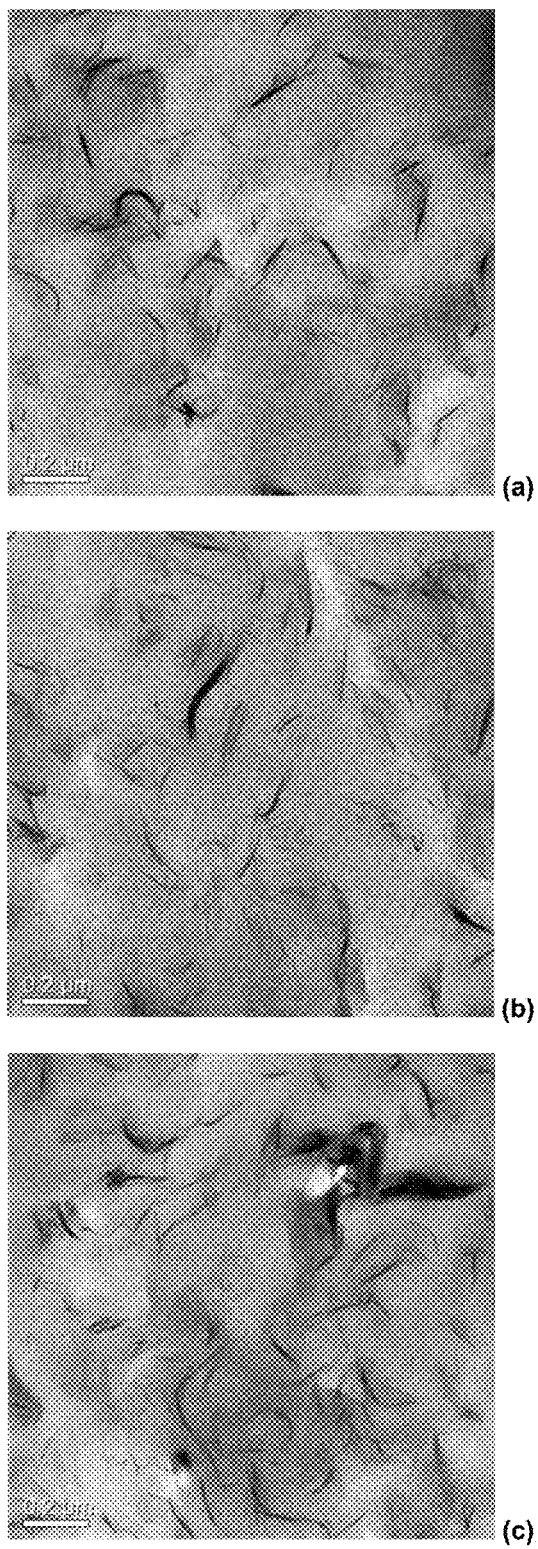
FIG. 3 shows TEM micrographs of the extruded polypropylene nanocomposite compounds: (a) PPNC1, (b) PPNC2, and (c) PPNC3 (scale bar=0.2 micron for all micrographs).

Characterization of Polypropylene Nanocomposites:

The dispersion of silylated clay from dry process in nanocomposites was characterized by TEM, as shown in FIG. 3. It appeared that most clay particles were exfoliated and well dispersed in polymer matrix. The amine functional groups present on the silane-treated clays can react with the anhydride group of the PP-g-MA, and this level of interaction leads to strong particle exfoliations. Also, as seen from Table 2, the mean stack thickness of nanolayers was about 5 to 6 nm when a compatibilizer loading to clay ratio of 2:1 was used.

TABLE 2

Estimated Mean Particle Thickness for Nanocomposites before and after Reprocessing

| Compound | Silylated clay loading | Ratio of PP-g-MA to clay | mean particle thickness (nm) |
|---|---|---|---|
| PPNC1 | 5% | 2:1 | 5.2 |
| PPNC2 | 8% | 2:1 | 5.8 |
| PPNC3 | 8% | 3:2 | 6.7 |

Figure 4:
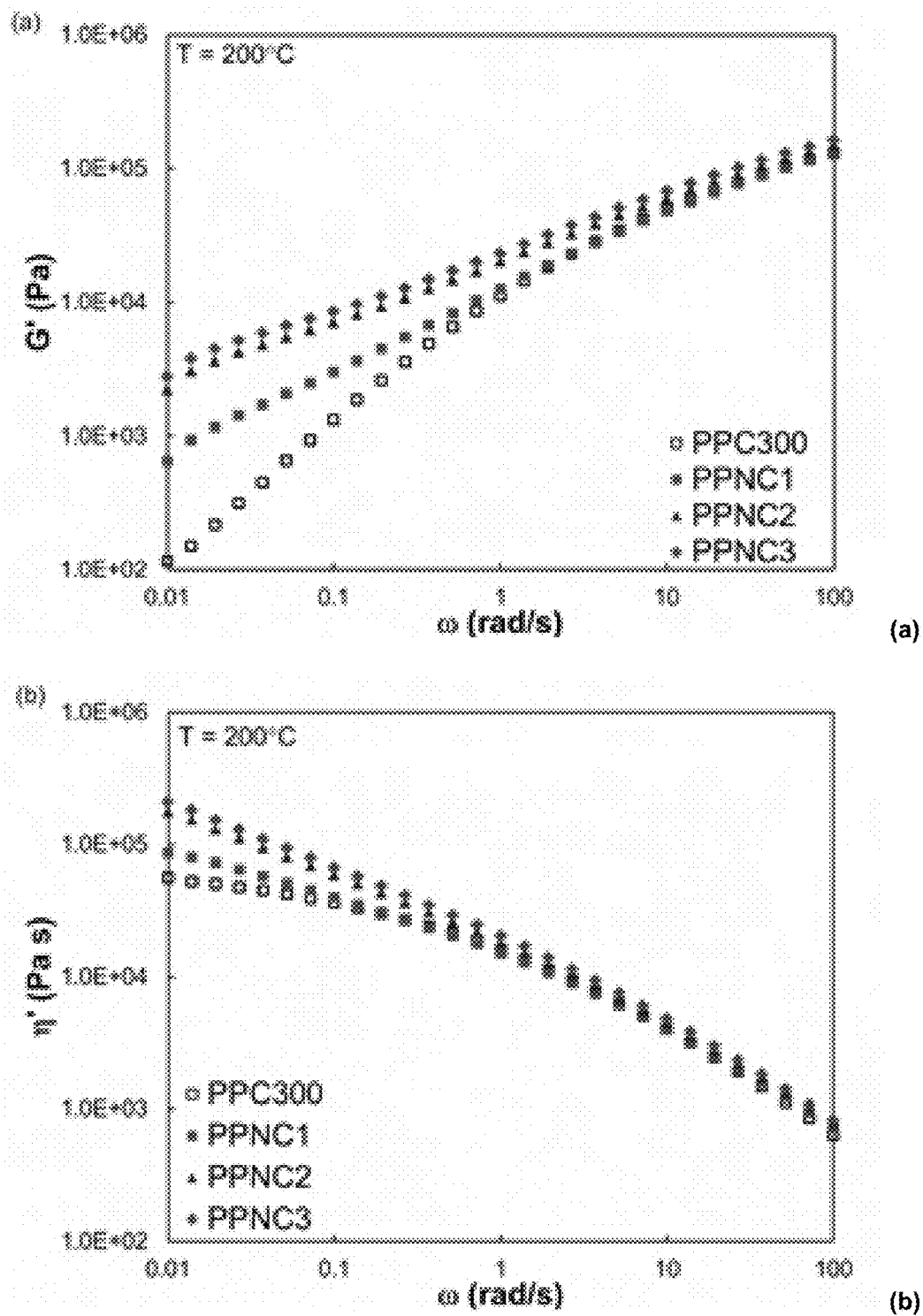
FIG. 4 includes graphs showing (a) storage modulus curves and (b) dynamic viscosity curves for neat PPC300 and nanocomposites prepared with silylated I.44P organoclay by a dry process.

Linear viscoelastic behavior at low frequencies—especially of the storage modulus curve can be used to infer the effect of the polymer-particle interactions for nanocomposite melts. The frequency-dependent dynamic shear storage modulus and dynamic viscosity for PPC300 and nanocomposites melts are shown in FIG. 4. The nanocomposites displayed increased storage modulus and dynamic viscosity comparing with the PPC300 and more so for the ones with 8 wt % of organoclay. This is a result of retarded chain relaxation and bridging between particles with entanglements involving particle attached chains and bulk polymers.

Figure 5:
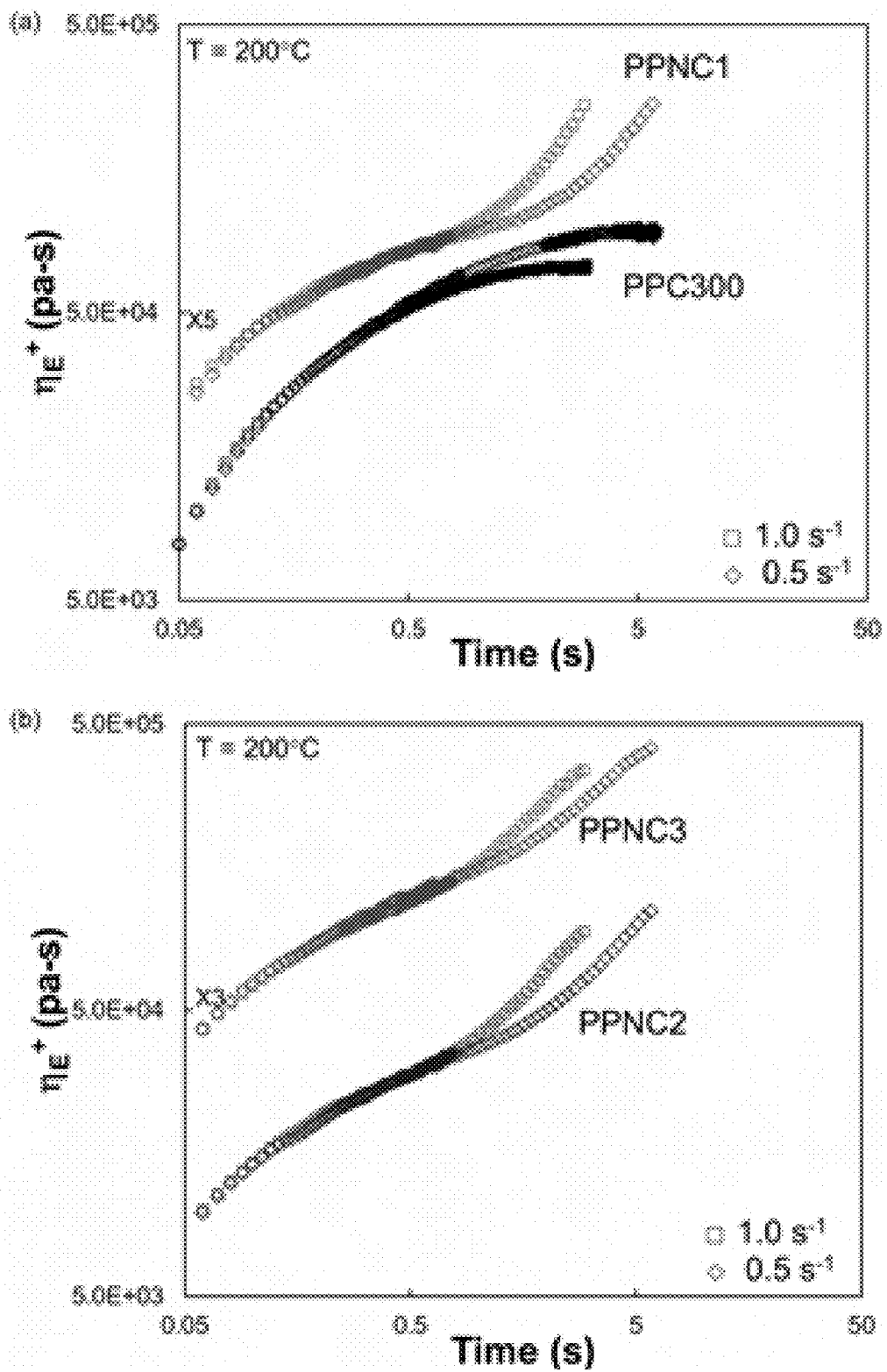
FIG. 5 includes graphs showing uniaxial extensional viscosity transients ($\eta_E+$) at several strain rates for neat PPC300 and nanocomposites prepared with silylated I.44P organoclay by a dry process.

The presence of strain hardening in uniaxial extensional flow of molten polymer is an important rheological property for film blowing process. FIG. 5 shows the uniaxial extensional viscosity transients of neat PP and nanocomposite melts at strain rates of 0.5 and 1.0 s$^{-1}$ with a maximum specified Hencky strain ($\varepsilon_H$) of 3. While the linear PP used in this example did not display strain hardening, the incorporation of PP-g-MA of high molecular weight and silylated organoclay from a dry process led to a strong strain hardening behavior. This may be caused by the trapped entanglement network involving the particle-attached compatibilizer chains at surfaces and edges of organoclay and the free polypropylene chains. The strain hardening ratio at maximum strain ($X_{max}$) was evaluated between the actual value of extensional viscosity and the value on the baseline curve extrapolated from the initial linear portion. The resulting ($X_{max}$) values were tabulated in Table 3. It is seen that the maximum strain hardening ratio for PPNC1 was around 2.5 at both strain rates. This value decreased when more organoclay was added as in PPNC2. When a lower amount of compatibilizer was used, PPNC3 displayed the lowest strain hardening ratio due to a decreased number of trapped entanglements with the presence of less particle-attached compatibilizer chains.

TABLE 3

Maximum strain hardening ratio at strain of 3 for polymer melts at 200° C.

| Strain rate | Strain hardening parameter @ $\varepsilon_H$ = 3.0 | | | |
|---|---|---|---|---|
| (s$^{-1}$) | PPC300 | PPNC1 | PPNC2 | PPNC3 |
| 0.5 | NA | 2.58 | 2.08 | 1.89 |
| 1.0 | NA | 2.55 | 2.36 | 2.16 |

Figure 6:
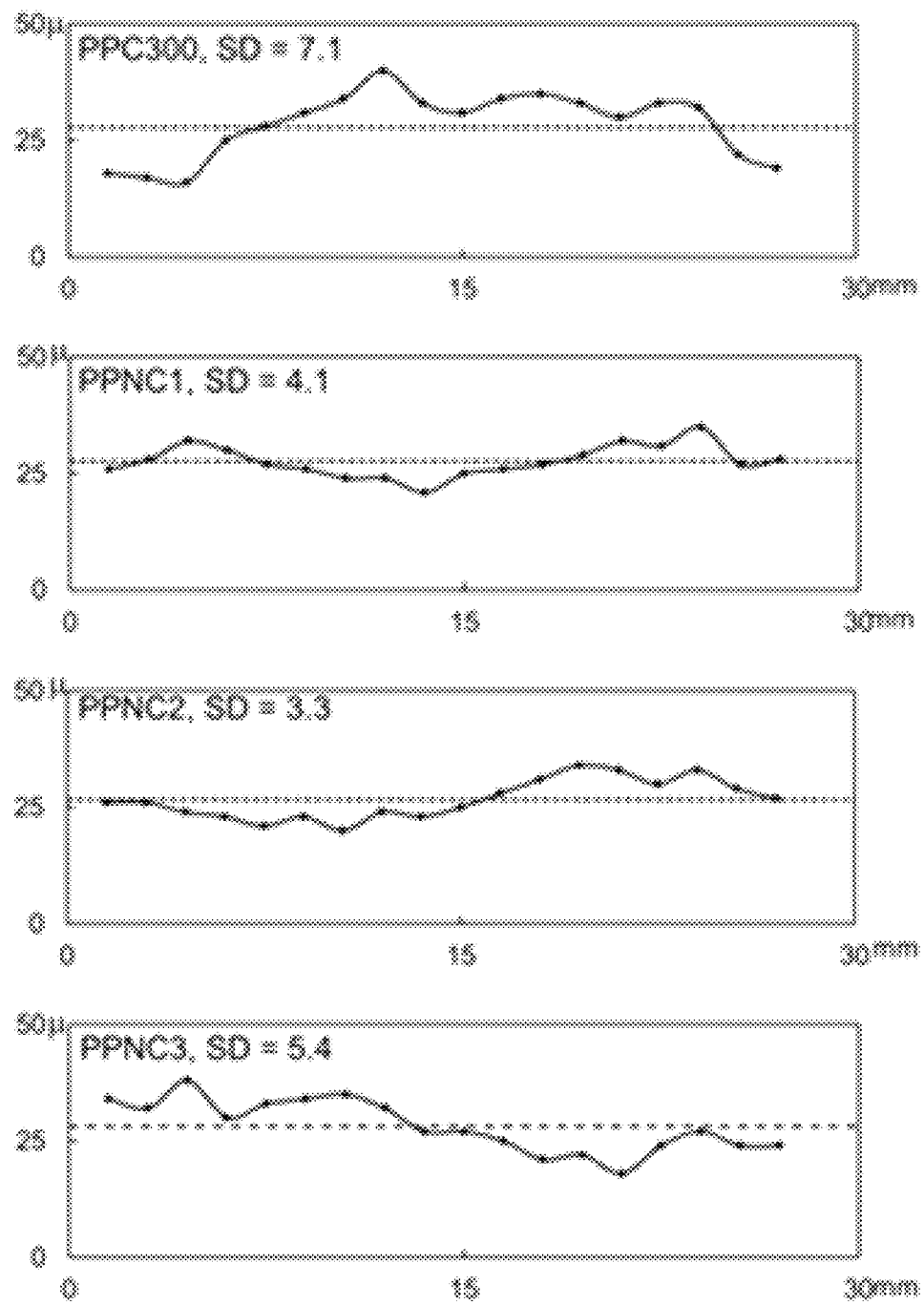
FIG. 6 includes graphs showing thickness variation (standard deviation; SD) in neat PPC300 and corresponding nanocomposite blown films.

Characterization of Blown Films:

FIG. 6 shows film thickness plotted against the positions along the circumference with the standard deviation values ("SD") displayed in each graph. All nanocomposite films showed improved thickness uniformity compared with neat PP film. Relative to a nominal 1 mil (25.4 micron thickness), the neat PP film had a relative standard deviation of about 28% (i.e., 7.1 micron standard deviation relative to 25.4 micron thickness), and the nanocomposite films had relative standard deviations of about 16% (PPNC1), 13% (PPNC2), and 21% (PPNC3). This improvement of blown film homogeneity has been reported to correlate with the occurrence of strain hardening behavior under uniaxial extensional flow by the so called "self-healing mechanism." A thin portion of a stretched film with larger elongation induces a high extent of strain hardening behavior as well as elongation viscosity. As a result it would exhibit a stronger resistance for further deformation comparing with the thick portion. With the same organoclay content (8 wt %), nanocomposite with higher PP-g-MA to clay ratio (2:1) possessed better thickness uniformity. This is consistent with the comparison of maximum strain hardening ratio shown in Table 2, as strong strain hardening behavior leads to better thickness uniformity of blown films. When the PP-g-MA to clay ratio of 2:1 remained the same, nanocomposite with 5 wt % clay displayed a slightly worse thickness uniformity than the one with 8 wt % clay. This was probably caused by the large $\eta_E$ ($\varepsilon'_0$;t) values when more clay was added.

Tensile properties of blown films are presented in Table 4 (absolute values) and Table 5 (anisotropy ratios). It must be noted in comparing mechanical properties of blown films that the PP used as matrix for nanocomposites in this example was a block copolymer of propylene with ethylene which is tougher than homopolymer PP and has high elongation to failure (500% along MD and 170% along TD). The elongation to break for the nanocomposite films was similar along the machine direction and was found to be much higher along the transverse direction (TD). The yield strength of the nanocomposite films was greater by up to 24% along the machine direction and by up to 90% along the transverse direction. The tensile strength of films made with MB1 was increased by 50 to 67% along the transverse direction TD along with 10% decrease along the machine direction MD. As for the tear strength tabulated in Table 4, the tear strength of PPC300 film along the machine direction MD decreased with the addition of organoclay, with the lowest values of 9.2 g for PPNC3. The tear strength along the transverse direction TD also decreased from 354 g for PPC300 film to about 60 g for both PPNC1 and PPNC2, while this value increased by 40% and reached 496.6 g for PPNC3.

TABLE 4

Mechanical properties of blown films of PPC300 and nanocomposites in machine and transverse directions (1 mil/25.4 micron thickness)

| Film | Yield strength (MPa) | | Tensile strength (MPa) | | Elongation at break (%) | | Tear strength (g) | |
|---|---|---|---|---|---|---|---|---|
| | MD | TD | MD | TD | MD | TD | MD | TD |
| PPC300 | 18.8 | 9.3 | 35.1 | 15.6 | 500.3 | 169.7 | 30.9 | 354 |
| PPNC1 | 20.4 | 17.6 | 29.7 | 26.0 | 474.7 | 538.7 | 28.4 | 64.4 |
| PPNC2 | 23.3 | 17.1 | 31.3 | 23.6 | 476.3 | 456.3 | 14.6 | 59.2 |
| PPNC3 | 22.9 | 9.7 | 30.7 | 18.7 | 538.7 | 341.7 | 9.2 | 496.6 |

TABLE 5

Anisotropy Ratios of TD Property to MD Property
(1 mil/25.4 micron thickness)

| Compound | Yield strength | Tensile Strength | Elongation to Break | Tear Strength |
|---|---|---|---|---|
| PPC300 | 0.49 | 0.44 | 0.34 | 11.4 |
| PPNC1 | 0.86 | 0.87 | 1.13 | 2.3 |
| PPNC2 | 0.73 | 0.75 | 0.96 | 4.0 |
| PPNC3 | 0.42 | 0.61 | 0.63 | 54.0 |

It is instructive to examine the orientation of crystalline lamellae and nanolayers in attempting to understand the trends among properties in Tables 4 and 5. For semicrystalline blown films, the birefringence data correspond to the overall molecular orientation including both the crystalline and amorphous regions. In the case of organoclay nanocomposite, the orientation of nanoparticles also contributes to the measured birefringence value. The birefringence data from various blown films is presented in Table 6. The in-plane orientation can be inferred by the $n_{11}$-$n_{22}$ refractive index values which indicate that the PPC300 blown film exhibited the highest degree of orientation. The birefringence values decreased progressively with the loading of nanoclay, reaching a transversely isotropic condition with 8 wt % organoclay.

TABLE 6

Refractive index and birefringence of blown films of PPC300 and nanocomposites

| | Refractive index | | | | | |
|---|---|---|---|---|---|---|
| | MD ($n_{11}$) | TD ($n_{22}$) | ND ($n_{33}$) | $n_{11} - n_{22}$ | $n_{11} - n_{33}$ | $n_{22} - n_{33}$ |
| PPC300 | 1.5218 | 1.5136 | 1.5139 | 0.0083 | 0.0079 | 0 |
| PPNC1 | 1.5190 | 1.5155 | 1.5122 | 0.0035 | 0.0068 | 0.0033 |
| PPNC2 | 1.5188 | 1.5167 | 1.5114 | 0.0021 | 0.0074 | 0.0053 |
| PPNC3 | 1.5184 | 1.5168 | 1.5121 | 0.0016 | 0.0063 | 0.0047 |

Figure 7:
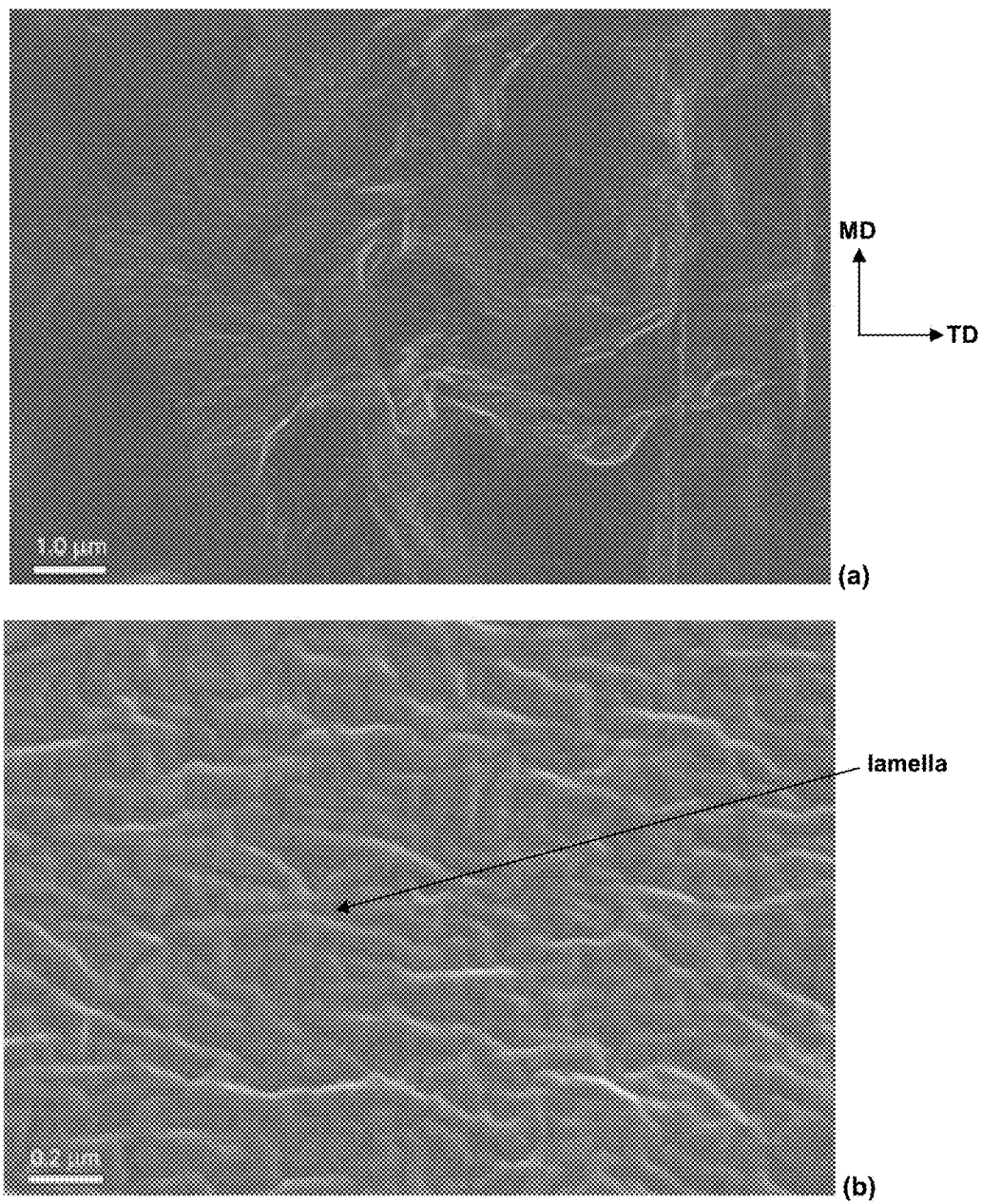
FIG. 7 shows FESEM micrographs illustrating lamellar orientation and extent of cross-hatching in a PPC300 blown film: (a) low magnification (scale bar=1 micron) and (b) high magnification (scale bar=0.2 micron).
Figure 8:
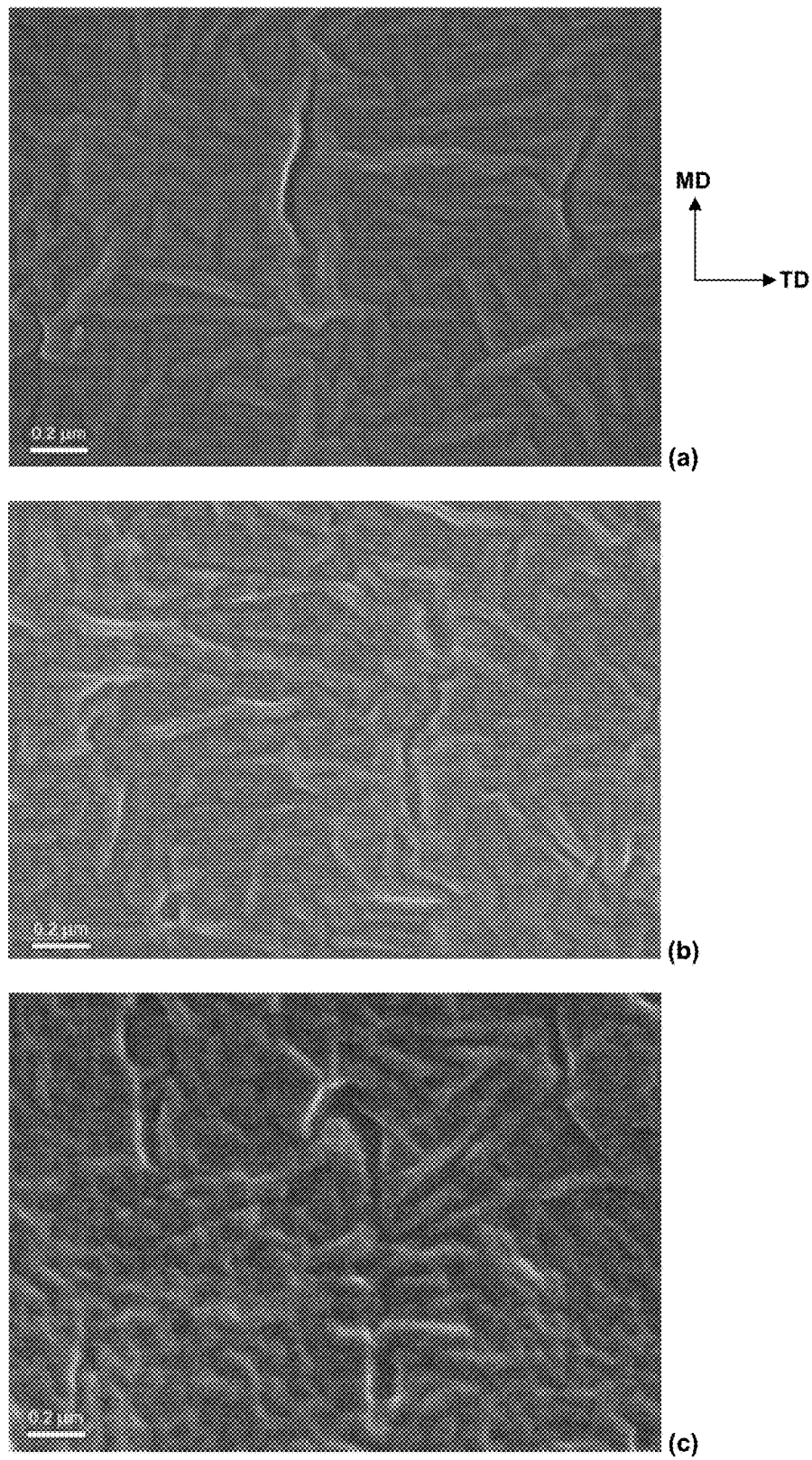
FIG. 8 shows FESEM micrographs illustrating lamellar orientation and extent of cross-hatching in blown films from various nanocomposites: (a) PPNC1, (b) PPNC2, and (c) PPNC3 (scale bar=0.2 micron for all micrographs).

The crystal structure as well as its orientation of various blown films was studied with FESEM. The crystallite structure with lamellar orientation is shown for PPC300 film in FIG. 7 under two different magnifications. It is apparent from these images that most lamellae aligned along the TD, although a small amount of lamellae perpendicular to TD was also detected due to the original cross-hatching structure in polypropylene spherulites. However, the orientation of lamellae in the nanocomposites occurred along both TD and along MD to an equal extent as observed in the FESEM images presented in FIG. 8 from the nanocomposite specimens. This is consistent with the transverse isotropy for nanocomposite blown films based on the in-plane birefringence values.

Figure 9:
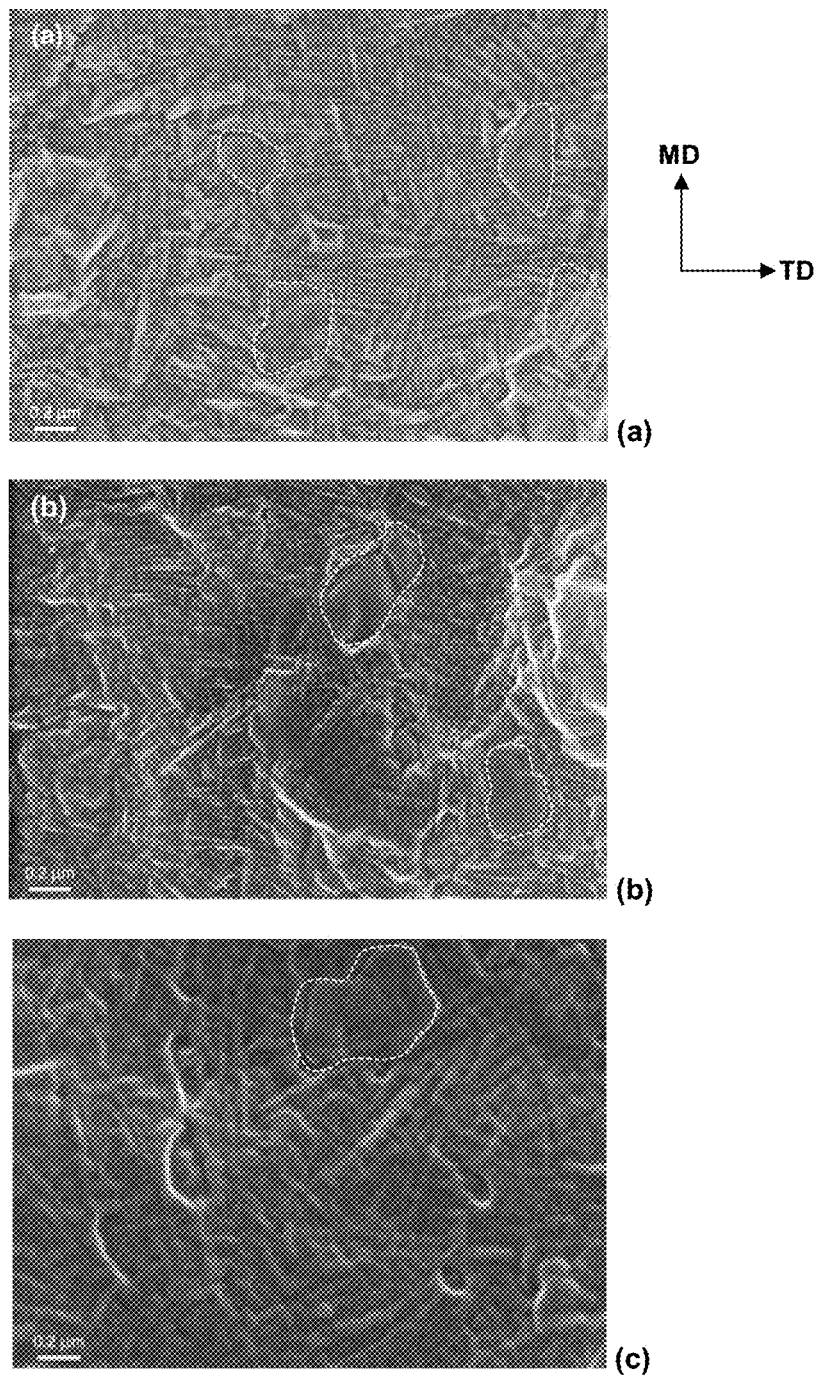
FIG. 9 shows FESEM micrographs illustrating the orientation of organoclay in various nanocomposite blown films, where the organoclay nanoparticles are enclosed with dashed lines: (a) PPNC1, (b) PPNC2, (c) PPNC3 (scale bar=0.2 micron for all micrographs).
Figure 10:
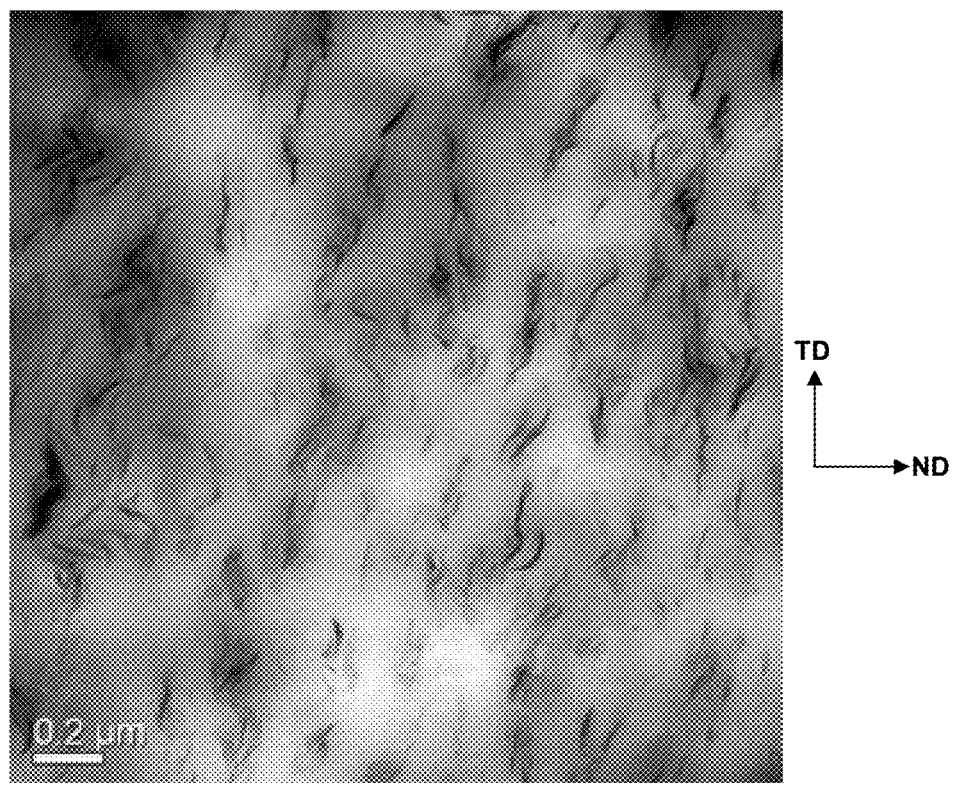
FIG. 10 shows a TEM micrograph of a PPNC2 blown film in cross section (scale bar=0.2 micron).

The dispersed organoclay particles were also observed in FESEM micrographs, as indicated in FIG. 9. Exfoliated silicate layers as pointed out by the encircling dashed lines were in the MD-TD plane of the films. The orientation of clay particles may be further illustrated with FIG. 10 where a TEM micrograph of PPNC2 film sliced along the TD-ND plane is presented. The silicate layers represented by dark lines oriented along the TD were exfoliated and well dispersed in the polymer matrix.

Figure 11:
FIG. 11 shows SEM micrographs illustrating film structure in a PROFAX 6523 polypropylene nanocomposite blown film formed without masterbatch compounding as disclosed herein (scale bar=1 micron).

The reinforcement effect of organoclay on mechanical properties of polyolefin blown films, such as tensile modulus, yield strength, and tensile strength has been reported by several authors. However, introduction of organoclay would also lead to a dramatic reduction of the elongation at break of the blown films. In order to understand the significant improvement in elongation at break mostly along TD for the blown films of nanocomposites in this example, the SEM images from blown film of a different organoclay-linear polypropylene nanocomposite are shown in FIG. 11. This nanocomposite was made without the masterbatches used for the others, by one-shot compounding 5 wt % of the nanoclay after silane treatment by the wet process (with trimethoxy amino silane), a compatibilizer to clay ratio of 7:1 and a different linear PP (Basell PROFAX 6523) as the matrix. The resulting blown film exhibited an elongation at break of 2.6% along the transverse direction (TD). Structurally, the film possessed lamellae aligning mostly along the TD, is similar to the neat PPC300 blown film discussed above. Its in-plane birefringence value was 0.0093, which is also close to that of the PPC300. Therefore, the orientation differences for both crystalline lamellae and silicate nanolayers are responsible for the improved elongation at break as shown in Table 3. The presence of lamellae oriented equally along MD and TD due to amorphous chain disentanglement and crystal slip led to a nearly transverse isotropic state for PPNC1, PPNC2 and PPNC3 films allowing better stretchability along the TD. Furthermore, organoclay oriented in the MD-ND plane has less reinforcement effect along the TD compared to organoclay oriented in the MD-TD plane, and facilitates the high elongation to break along the TD.

The microstructure also affects the tear strength of blown films. Zhang et al. studied the polymer orientation of HDPE, LDPE and LLDPE blown films, and showed its correlation with the tear strength difference in MD and TD. PPC300 with a preferential lamellae orientation along the TD led to a much higher TD tear strength comparing with the value along MD. This difference in tear strength along MD and TD decreased for both PPNC1 and PPNC2 because of the increased isotropy in lamellar orientation.

Summary

The incorporation of 1 wt % silane in organoclay through a dry process was more effective in obtaining good coupling at the gallery faces through penetration of silane into the galleries. The masterbatch made with a 2:1 ratio (weight basis) of maleated polypropylene compatibilizer to this silylated organoclay produced very good dispersions of the nanolayers after let-down with the bulk polypropylene at both loadings of 5 wt % and 8 wt %. The dry process of organoclay silylation also led to prominent strain hardening in uniaxial extensional flow of the let-down composites with 5 to 8 wt % organoclay. Film blowing with these nanocomposites gives films with a smaller spread in thickness (12%) than with the neat polypropylene (26%).

The anisotropy of various blown films was evaluated from mechanical tests and from refractive index measurements and both estimates were consistent. The anisotropy of the films estimated from mechanical properties of the films along the machine direction and the transverse direction was less in the nanocomposite films with the 2:1 masterbatch (MB1) than in the neat PP films. The anisotropy of overall orientation in these films, estimated with refractive index measurements was also highest for the neat PP and decreased progressively with clay loading in the nanocomposite films.

The crystalline lamellar orientation, imaged by means of FESEM was seen to be primarily along the transverse direction (TD) for the neat PP film; the lamellar orientation was seen to be more evenly distributed in the plane of the film for the nanocomposite films. In contrast to the nanocomposite films made with dry process silylated organoclay, the nanocomposite film made with wet process silylated organoclay had a lamellar orientation similar to that in the neat PP. The orientation of the nanolayers in the nanocomposite films with dry phase silylated organoclay was normal to the transverse direction (i.e. the plane normal were along TD); in contrast, the orientation of the nanolayers was normal to the thickness direction (ND) in the nanocomposite film with wet phase silylated organoclay.

Example 2: Effect of Coupling Agent Amount on Organoclay Modification

Polymer nanocomposite preparation frequently involves adding masterbatches to bulk polymer in a "let-down" operation using a twin-screw extruder. The masterbatch usually has a large loading of the clay nanolayers (30 to 50 wt %) combined with polymer components that might have low molecular weights and low melt viscosity. The polymer components in the masterbatch are usually mixtures of chains with reactive end groups and chains without any reactive end groups. Such masterbatches may yield good dispersions of nanolayers but they also bring down some essential properties including the ease of film blowing or melt strength of the final compound—especially when compared to the bulk polymer that is of high molecular weight. In order to offset this, silane coupling agents are used to treat the organoclay; combinations of specific silane coupling agents and long chain polymer compatibilizer have been formulated in optimal proportions by our group to yield enhanced processability as well as enhanced product properties. Silane treatment of the organoclay in this example was carried out by a dry process without any solvents as described above in Example 1. The resulting treated clay was then sieved to remove clumps before further use.

Figure 12:
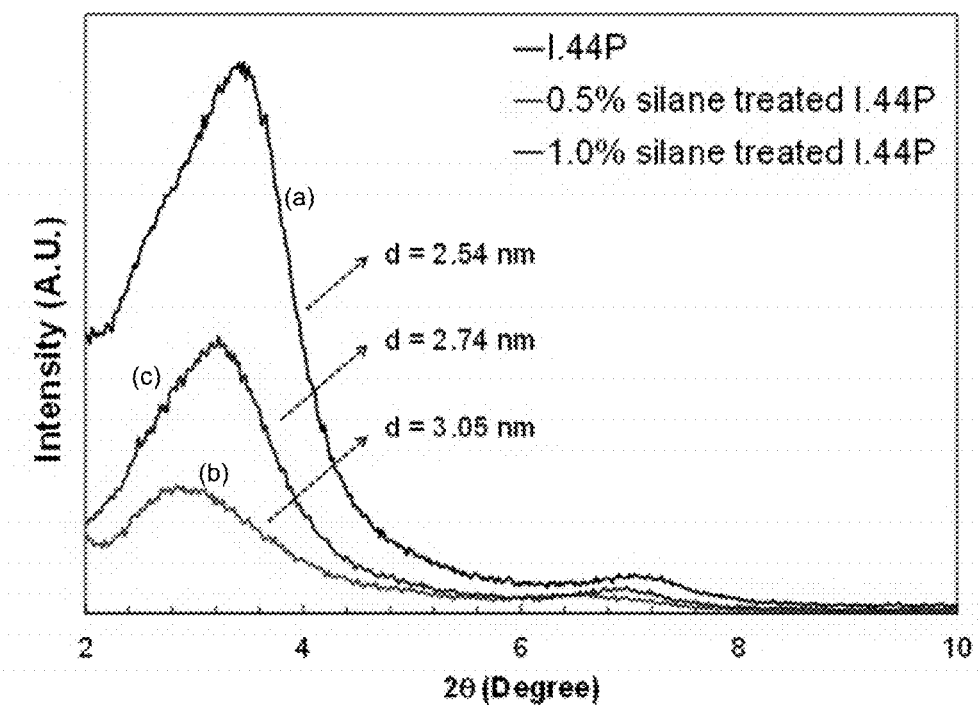
FIG. 12 is a graph showing XRD patterns of (a) I.44P untreated organoclay, (b) silylated organoclay by dry process at 0.5 wt. % vapor, and (c) silylated organoclay by dry process at 1 wt. % vapor.

The NANOMER I.44P and aminoalkyldimethoxysilane silane coupling agent from Example 1 were used in this example. The organoclay was treated with the dry process as described in Example 1 at levels of 0.5 wt. % and 1 wt. % refluxed silane vapor. The treated organoclay was tested for TGA and XRD properties as in Example 1. Different extents of silane treatment may be seen from XRD scans presented in FIG. 12 of the organoclay with and without silane treatment. The silane expands the interlayer spacing in the organoclay as shown by XRD patterns presented for the I.44P organoclay before and after different extents of silane treatment: 0.5 wt. % silane treatment leads to an expanded d-spacing of 3.05 nm between the nanolayers, and 1 wt. % silane treatment leads to an expanded d-spacing of 2.74 nm between the nanolayers.

Example 3: Film Temperature Resistance

The PPNC1-PPNC3 nanocomposite films and comparison PPC300 polymer film as made in Example 1 but at film thicknesses of 1 mil (25.4 micron) and 0.6 mil (15.2 micron) were tested for their ability to remain stable at elevated temperatures, for example for their ability to resist sticking, deformation, and/or melting.

Film temperature resistance/stability was tested by stacking 8 sheets of the test film on top of each other (i.e., 8 sheets of PPNC1, PPNC2, PPNC3, or PPC300 film with a consistent thickness about 0.6 mil or 1 mil for this example). A weight was placed on the films to hold them in place. The stack of films was exposed for 15 minutes to a selected temperature (e.g., starting at 100° C., 125° C., or other suitable temperature in an oven or with any suitable controlled-temperature environment). If no sticking together of the films in the stack, film deformation, and/or film melting was observed, the temperature was increased (e.g., any desired increment such as 1° C., 5° C., or 10° C.) and the test repeated with the 15-minute heating and observation cycle. Near the failure point (e.g., when deformation and/or melting begins to be observed), temperatures were increased in smaller increments to better identify the end failure point of melting and/or severe deformation.

Film samples were tested according to the foregoing procedure. For the 0.6 mil and 1 mil PPNC1, PPNC2, and PPNC3 samples, the films were observed to be heat-stable with no observed deformation or sticking at temperatures of 125° C., 130° C., 140° C., 150° C., and 160° C., some onset of sticking was observed at 165° C., and failure in terms of severe deformation/melting was observed at 170° C. For the 0.6 mil and 1 mil PPC300 samples, the films were observed to be heat-stable with no observed deformation or sticking at temperatures of 125° C., 130° C., 140° C., 150° C., and 160° C., and failure in terms of severe deformation/melting was observed at 165° C. Thus, the nanocomposite films according to the disclosure were more heat stable than a corresponding thermoplastic polymer film based on a higher temperature for ultimate heat failure. A 1 mil-thick high density polyethylene (HDPE) film was also tested for heat stability, and failure in terms of severe deformation/melting was observed at the initial temperature of 125° C.

Because other modifications and changes varied to fit particular operating requirements and environments will be apparent to those skilled in the art, the disclosure is not considered limited to the examples chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compounds, compositions, methods, and processes are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous

REFERENCES

1. W. J. Ren, A. K. Chaudhary and K. Jayaraman, Ind Eng Chem Res 54:4264-4273 (2015).
2. P. Micic, S. N. Bhattacharya and G. Field, Polym Eng Sci 38:1685-1693 (1998).
3. H. Munstedt, S. Kurzbeck and J. Stange, Polym Eng Sci 46:1190-1195 (2006).
4. H. Munstedt, T. Steffl and A. Malmberg, Rheol Acta 45:14-22 (2005).
5. S. H. Tabatabaei, P. J. Carreau and A. Ajji, Polym Eng Sci 50:191-199 (2010).
6. J. Stange, C. Uhl and H. Munstedt, J Rheol 49:1059-1079 (2005).
7. A. K. Chaudhary and K. Jayaraman, Polym Eng Sci 51:1749-1756 (2011).
8. S. Arunvisut, S. Phummanee and A. Somwangthanaroj, J Appl Polym Sci 106:2210-2217 (2007).
9. K. H. Wang, C. M. Koo and I. J. Chung, J Appl Polym Sci 89:2131-2136 (2003).
10. S. H. Tabatabaei and A. Ajji, J Plast Film Sheet 27:87-115 (2011).
11. C. Lotti, C. S. Isaac, M. C. Branciforti, R. M. V. Alves, S. Liberman and R. E. S. Bretas, Eur Polym J 44:1346-1357 (2008).
12. R. K. Shah, R. K. Krishnaswamy, S. Takahashi and D. R. Paul, Polymer 47:6187-6201 (2006).
13. A. Mirzadeh and M. Kokabi, Eur Polym J 43:3757-3765 (2007).
14. R. K. Shah and D. R. Paul, Polymer 45:2991-3000 (2004).
15. H. S. Lee, P. D. Fasulo, W. R. Rodgers and D. R. Paul, Polymer 46:11673-11689 (2005).
16. Y. Shi, S. Peterson and D. Y. Sogah, Chem Mater 19:1552-1564 (2007).
17. H. P. He, Q. Tao, J. X. Zhu, P. Yuan, W. Shen and S. Q. Yang, Appl Clay Sci 71:15-20 (2013).
18. H. D. Lu, Y. Hu, M. Li, Z. Y. Chen and W. C. Fan, Compos Sci Technol 66:3035-3039 (2006).
19. J. W. Lee, M. H. Kim, W. M. Choi and O. O. Park, J Appl Polym Sci 99:1752-1759 (2006).
20. W. Shen, H. P. He, J. X. Zhu, P. Yuan and R. L. Frost, J Colloid Interf Sci 313:268-273 (2007).
21. H. He, J. Duchet, J. Galy and J.-F. Gerard, J Colloid Interf Sci 295:202-208 (2006).
22. X. M. Zhang, S. Elkoun, A. Ajji and M. A. Huneault, Polymer 45:217-229 (2004).
23. H. Y. Chen, M. T. Bishop, B. G. Landes and S. P. Chum, J Appl Polym Sci 101:898-907 (2006).
24. Jayaraman et al. U.S. Publication No. 2010/03100802.

What is claimed is:

1. A nanocomposite polymeric film comprising:
   (a) a thermoplastic polymer matrix;
   (b) a coupling agent-modified organoclay, wherein the coupling agent is covalently bonded and hydrogen-bonded to both edges and faces of the organoclay; and
   (c) a polymeric compatibilizer bound to the coupling agent-modified organoclay.

2. The nanocomposite polymeric film of claim 1, wherein the thermoplastic polymer matrix comprises one or more of a polyolefin, polyacrylate, poly(acrylonitrile-butadiene-styrene), poly(lactic acid), polybenzimidazole, polycarbonate, polyether sulfone, polyetherether ketone, polyetherimide, polyphenylene oxide, polyphenylene sulfide, polystyrene, polyvinyl chloride polyester, polyamide, copolymers thereof, and combinations thereof.

3. The nanocomposite polymeric film of claim 1, wherein the thermoplastic polymer comprises a polyolefin selected from the group consisting of polyethylene, polypropylene, polymethylpentene, polybutene, block copolymers thereof, random copolymers thereof, and mixtures thereof.

4. The nanocomposite polymeric film of claim 1, wherein the thermoplastic polymer comprises polypropylene.

5. The nanocomposite polymeric film of claim 1, wherein the coupling agent comprises a silane coupling agent.

6. The nanocomposite polymeric film of claim 1, wherein the organoclay comprises a smectite clay.

7. The nanocomposite polymeric film of claim 1, wherein the coupling agent-modified organoclay has an interlayer spacing between adjacent organoclay platelets of at least 0.1 nm greater than the interlayer spacing of a corresponding organoclay without the coupling agent modification.

8. The nanocomposite polymeric film of claim 1, wherein the polymeric compatibilizer is bound to the coupling agent-modified organoclay at the edges and the faces of the organoclay.

9. The nanocomposite polymeric film of claim 1, wherein the polymeric compatibilizer comprises a maleate functional group.

10. The nanocomposite polymeric film of claim 1, wherein the polymeric compatibilizer comprises a thermoplastic polymer and a modifier functional group for binding to the coupling agent-modified organoclay.

11. The nanocomposite polymeric film of claim 1, wherein the film has a thickness of 1 mil or less.

12. The nanocomposite polymeric film of claim 1, wherein the film has a thickness ranging from 0.2 mil to 0.8 mil.

13. The nanocomposite polymeric film of claim 1, wherein the film has a thickness relative standard deviation (RSD) of 25% or less.

14. The nanocomposite polymeric film of claim 1, wherein the ratio of the polymeric compatibilizer to the coupling agent-modified organoclay ranges from 0.1 to 10.

15. The nanocomposite polymeric film of claim 1, wherein the combined amount of the polymeric compatibilizer and the coupling agent-modified organoclay in the nanocomposite polymeric film ranges from 2 wt. % to 50 wt. %.

16. The nanocomposite polymeric film of claim 1, wherein the amount of the coupling agent-modified organoclay in the nanocomposite polymeric film ranges from 0.5 wt. % to 15 wt. c/o.

17. The nanocomposite polymeric film of claim 1, wherein the amount of the thermoplastic polymer in the nanocomposite polymeric film ranges from 50 wt. % to 98 wt. %.

18. A nanocomposite polymeric film comprising:
   (a) a thermoplastic polymer matrix comprising polypropylene;
   (b) a silane coupling agent-modified organoclay, wherein (i) the silane coupling agent is covalently bonded and hydrogen-bonded to both edges and faces of the organoclay, and (ii) the silane coupling agent-modified organoclay has an interlayer spacing between adjacent organoclay platelets of at least 0.1 nm greater than the interlayer spacing of a corresponding organoclay without the coupling agent modification; and
   (c) a maleated polyolefin polymeric compatibilizer bound to the silane coupling agent-modified organoclay;

wherein:
(i) the film has a thickness of 1 mil or less; and
(ii) the film has a thickness relative standard deviation (RSD) of 25% or less.

19. A masterbatch additive comprising:
(a) a coupling agent-modified organoclay, wherein (i) the coupling agent is covalently bonded and hydrogen-bonded to both edges and faces of the organoclay, and (ii) the coupling agent-modified organoclay has an interlayer spacing between adjacent organoclay platelets of at least 0.1 nm greater than the interlayer spacing of a corresponding organoclay without the coupling agent modification; and
(b) a polymeric compatibilizer bound to the coupling agent-modified organoclay.

20. A method for making a nanocomposite polymeric film, the method comprising: (a) providing a polymer melt comprising: (i) a thermoplastic polymer, (ii) a coupling agent-modified organoclay, wherein the coupling agent is covalently bonded and hydrogen-bonded to both edges and faces of the organoclay, and (iii) a polymeric compatibilizer bound to the coupling agent-modified organoclay;
(b) blowing or extruding and stretching the polymer melt to form the nanocomposite polymeric film.

21. The method of claim 20, wherein providing the polymer melt comprises melt blending a masterbatch additive comprising the coupling agent-modified organoclay and the polymeric compatibilizer with the thermoplastic polymer.

22. The nanocomposite polymeric film of claim 1, wherein the organoclay comprises a layered smectite clay and organophilic ions exchanged into interlayer galleries of the layered smectite clay.

* * * * *